United States Patent
Hu et al.

(10) Patent No.: US 11,558,784 B2
(45) Date of Patent: Jan. 17, 2023

(54) RESOURCE ALLOCATION METHOD, APPARATUS, AND SYSTEM, AND STORAGE MEDIUM

(71) Applicant: Huawei Technologies Co., Ltd., Shenzhen (CN)

(72) Inventors: Zhibo Hu, Beijing (CN); Gang Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/097,583

(22) Filed: Nov. 13, 2020

(65) Prior Publication Data

US 2021/0153079 A1    May 20, 2021

(30) Foreign Application Priority Data

Nov. 14, 2019   (CN) .......................... 201911111018.8
Feb. 28, 2020   (CN) .......................... 202010131400.1

(51) Int. Cl.
*H04W 28/26*   (2009.01)
*H04W 28/02*   (2009.01)
*H04W 48/18*   (2009.01)
*H04W 28/18*   (2009.01)

(52) U.S. Cl.
CPC ....... *H04W 28/26* (2013.01); *H04W 28/0263* (2013.01); *H04W 28/18* (2013.01); *H04W 48/18* (2013.01)

(58) Field of Classification Search
None
See application file for complete search history.

(56) References Cited

U.S. PATENT DOCUMENTS

| | | | |
|---|---|---|---|
| 6,912,232 B1* | 6/2005 | Duffield | H04L 47/805 370/231 |
| 2006/0039313 A1* | 2/2006 | Chou | H04L 47/808 370/328 |
| 2006/0250959 A1 | 11/2006 | Porat | |
| 2011/0246647 A1 | 10/2011 | Marquezan et al. | |
| 2012/0069739 A1 | 3/2012 | Yabusaki et al. | |

(Continued)

FOREIGN PATENT DOCUMENTS

| | | |
|---|---|---|
| CN | 102404194 A | 4/2012 |
| CN | 107659419 A | 2/2018 |

(Continued)

OTHER PUBLICATIONS

Filsfils, C., Ed., et al., "IPv6 Segment Routing Header (SRH)," draft-ietf-6man-segment-routing-header-25, Oct. 10, 2019, 32 pages.

(Continued)

*Primary Examiner* — Eunsook Choi
(74) *Attorney, Agent, or Firm* — Conley Rose, P.C.

(57) ABSTRACT

A resource allocation method includes: obtaining, by a first network device, target resource reservation information based on a plurality of transmitted packets, where all of the packets carry a same virtual network identifier, and the virtual network identifier is used to indicate that the packets are transmitted through a same virtual network; and allocating a resource to the virtual network based on the target resource reservation information.

20 Claims, 7 Drawing Sheets

(56) References Cited

U.S. PATENT DOCUMENTS

| | | | | |
|---|---|---|---|---|
| 2012/0213078 A1* | 8/2012 | Kitada | ................... | H04L 47/17 370/236 |
| 2019/0124704 A1 | 4/2019 | Sun et al. | | |
| 2019/0140904 A1 | 5/2019 | Huang et al. | | |
| 2020/0244591 A1 | 7/2020 | Meng et al. | | |

FOREIGN PATENT DOCUMENTS

| | | | |
|---|---|---|---|
| CN | 109391563 | A | 2/2019 |
| EP | 3343978 | A1 | 7/2018 |
| EP | 3621243 | A1 | 3/2020 |
| JP | 2008532358 | A | 8/2008 |
| JP | 2012065135 | A | 3/2012 |
| JP | 2012511292 | A | 5/2012 |
| JP | 2013175810 | A | 9/2013 |
| WO | 2018201787 | A1 | 11/2018 |
| WO | 2018201822 | A1 | 11/2018 |

OTHER PUBLICATIONS

Filsfils, C., Ed. et al., "Network Programming extension: SRv6 uSID," instruction draft-filsfils-spring-net-pgm-extension-srv6-usid-02, Aug. 28, 2019, 14 pages.

* cited by examiner

RESOURCE ALLOCATION METHOD, APPARATUS, AND SYSTEM, AND STORAGE MEDIUM

CROSS-REFERENCE TO RELATED APPLICATIONS

This claims priority to Chinese Patent App. No. 202010131400.1, filed on Feb. 28, 2020, and Chinese Patent App. No. 201911111018.8, filed on Nov. 14, 2019, which are incorporated by reference.

FIELD

This disclosure relates to the communications field, and in particular, to a resource allocation method, apparatus, and system, and a storage medium.

BACKGROUND

As a network communication connection capability is constantly enhanced, digital transformation occurs in nearly all industries, to improve work and production efficiency. For example, the digital transformation includes a holographic technique-based virtual conference or virtual class, remote real-time control on a large-size machine in a dangerous environment, remote surgery, and mobile broadband in a high-speed mobile vehicle environment. The digital transformation has increasing and diversified requirements on the network connection capability. In different use cases, there are different requirements on a network in terms of speed, performance, security, reliability, latency, or the like. It is increasingly difficult for a single conventional network to meet all connection capability requirements. In this case, a 5th generation (5G) technology proposes a concept of a virtual network, for example, network slicing. The virtual network is used to meet a connection service requirement of a use case. An entire 5 G system includes a large quantity of virtual networks meeting different connection capabilities. For example, a virtual network 1 meets a requirement of ultra-reliable low-latency communication (URLLC), a virtual network 2 meets a requirement of enhanced mobile broadband (EMBB), and a virtual network 3 meets a requirement of massive machine-type communications (MMTC).

Currently, a control device plans resource reservation information of a virtual network, and delivers the planned resource reservation information of the virtual network to a network device. The network device allocates a resource to the virtual network based on the resource reservation information delivered by the control device. However, the resource allocated by the network device based on the resource reservation information planned by the control device may not meet an actual requirement, and consequently, transmission efficiency is low; or the allocated resource may exceed an actual requirement, and consequently, a resource is wasted.

SUMMARY

Embodiments provide a resource allocation method, apparatus, and system, and a storage medium, to resolve a technical problem that a resource allocated by a network device does not match an actual requirement, and consequently, transmission efficiency is low or a resource is wasted in a conventional technology.

According to a first aspect, an embodiment provides a resource allocation method, and the method may be performed by a first network device. The method includes the following steps: The first network device obtains target resource reservation information based on a plurality of transmitted first packets, where all of the plurality of first packets carry a same virtual network identifier, and the virtual network identifier is used to indicate that all the first packets are transmitted through a same virtual network. The virtual network may be, for example, a sliced network, and the virtual network identifier may be, for example, a sliced network identifier. The first network device allocates a resource to the virtual network based on the target resource reservation information. In this embodiment, the target resource reservation information may be, for example, one or more of bandwidth information, use duration information, and the like. Optionally, the target resource reservation information may further include one or more of physical interface information, logical interface information, queue information, and the like. After allocating the resource, the first network device may transmit, through the resource, a second packet carrying the virtual network identifier, to forward the packet by using the allocated resource. The target resource reservation information used to allocate the resource is not obtained through planning as in a conventional manner, but is obtained based on an actual resource parameter of the plurality of first packets. This means that the target resource reservation information is obtained based on an actual requirement. Therefore, not only a problem that transmission efficiency is low because a quantity of allocated resources is less than an actual requirement in the conventional manner is resolved, but also a problem that a resource is wasted because a quantity of allocated resources is greater than an actual requirement in the conventional manner is resolved.

In a possible implementation, that the first network device obtains target resource reservation information based on a plurality of transmitted first packets includes: The first network device obtains a resource parameter based on the plurality of transmitted first packets. The first network device obtains the target resource reservation information based on the resource parameter.

In this embodiment, the resource parameter is a parameter used by a network device to calculate a quantity of resources to be reserved for the virtual network, and reflects an actual resource requirement of the plurality of first packets.

In a possible implementation, the resource parameter includes at least one of the following: a traffic peak and a traffic average, the traffic peak is a maximum value of traffic of a flow corresponding to the plurality of first packets, and the traffic average is an average value of traffic of the flow corresponding to the plurality of first packets in a period of time. The traffic peak and the traffic average each are obtained by the first network device by performing statistics collection based on the plurality of first packets. Correspondingly, that the first network device obtains the target resource reservation information based on the resource parameter includes: The first network device obtains the target resource reservation information based on the traffic peak and/or the traffic average. Because the traffic peak and/or the traffic average reflect/reflects an actual requirement of the virtual network, when the resource is allocated based on the target resource reservation information obtained based on the traffic peak and/or the traffic average, packet transmission efficiency can be ensured, and a resource waste can be avoided.

In another possible implementation, the resource parameter is a feature information set of the plurality of first packets. Specifically, that the first network device obtains a resource parameter based on the plurality of transmitted first packets includes: The first network device obtains the feature information set of the plurality of first packets, where the feature information set includes one or more pieces of feature information, and the resource parameter includes the feature information set. The feature information is information that represents a packet feature. The feature information may be used to identify one or more flows, or may be used to identify a user. When the feature information is used to identify one or more flows, the feature information may be, for example, one or more of a flow identifier (ID), a triplet, a 5-tuple, or a 7-tuple. When the feature information is used to identify a user, the feature information may be a user ID. The user identifier may be an account name of a corresponding application of the user, an identifier of a terminal device, or the like. This is not specifically limited in this embodiment. The resource parameter is obtained based on a resource requirement corresponding to the feature information of the plurality of first packets, the target resource reservation information is obtained based on the resource parameter, and the resource is allocated based on the target resource reservation information. Therefore, packet transmission efficiency can be ensured, and a resource waste can be avoided.

Correspondingly, that the first network device obtains the target resource reservation information based on the resource parameter includes: The first network device obtains the target resource reservation information based on a sum of resource requirements corresponding to all pieces of feature information in the feature information set. Optionally, a resource requirement corresponding to each piece of feature information is carried in one or more first packets that are in the plurality of first packets and that correspond to the feature information, or a resource requirement corresponding to each piece of feature information is a preset resource requirement. Alternatively, the first network device obtains the target resource reservation information based on a product of a quantity of pieces of feature information in the feature information set and a preset resource requirement. The target resource reservation information obtained in each of the foregoing two manners can reflect an actual requirement of the virtual network to some extent. Therefore, packet transmission efficiency can be ensured, and a resource waste can be avoided.

It may be understood that the foregoing possible implementations do not limit the technical solutions of this disclosure, and a person skilled in the art may design the technical solutions based on an actual requirement.

Optionally, that the first network device obtains the target resource reservation information based on the resource parameter includes: The first network device obtains first resource reservation information based on the resource parameter, and sends a first request to a control device, where the first request includes the first resource reservation information, and the first request is used to indicate the control device to determine the target resource reservation information based on the first resource reservation information. The first network device receives a first message sent by the control device, where the first message includes the target resource reservation information, and the first message is a response to the first request. The target resource reservation information may be the same as or different from the first resource reservation information. Although the target resource reservation information is delivered by the control device, the target resource reservation information is obtained based on the first resource reservation information that represents an actual requirement of the virtual network. Therefore, in comparison with those in a conventional manner, packet transmission efficiency is improved and resources are saved to some extent.

Optionally, when the plurality of first packets correspond to a same destination node, the first request further includes an identifier of the destination node. The identifier of the destination node is used to determine information about a forwarding path from the first network device to the destination node based on the first resource reservation information. The information about the forwarding path may be path information that is used to indicate the first network device to forward the first packet, for example, a segment identifier (SID) list, or outbound interface information. Correspondingly, the first message received by the first network device further includes the information about the forwarding path, so that a second packet including the virtual network identifier is forwarded through the forwarding path corresponding to the information about the forwarding path.

Optionally, that the first network device obtains the target resource reservation information based on the resource parameter includes: The first network device obtains first resource reservation information based on the resource parameter. The first network device receives a second message from a second network device, where the second message includes second resource reservation information that is determined by the second network device and that corresponds to the virtual network. The first network device determines the target resource reservation information based on the first resource reservation information and the second resource reservation information. The second network device is a network device that can communicate with the first network device, and the second network device may be a neighboring node or a non-neighboring node of the first network device. Correspondingly, the first network device may send a third message to the second network device. The third message includes the first resource reservation information, and the third message is used to indicate the second network device to determine, based on the first resource reservation information, a resource that needs to be allocated to the virtual network. According to the foregoing steps, the first network device and the second network device can negotiate the target resource reservation information, to ensure consistency of the resources allocated by the first network device and the second network device to the virtual network.

Optionally, the first network device sends a fourth message to a third network device. The fourth message includes the target resource reservation information, and the fourth message is used to indicate the third network device to determine, based on the target resource reservation information, a resource that needs to be allocated to the virtual network. In this way, consistency of the resources allocated by the first network device and the third network device to the virtual network is ensured. The third network device may be the foregoing second network device.

Optionally, after the first network device allocates the resource to the virtual network based on the target resource reservation information, the method further includes: The first network device releases the resource if the first network device determines that the first network device obtains, in a preset time period, no second packet including the virtual network identifier, to save an allocable resource of the first network device.

Optionally, the first network device transmits the plurality of first packets through a same communications interface, and that the first network device allocates a resource to the virtual network based on the target resource reservation information includes: The first network device allocates a resource of the communications interface to the virtual network based on the target resource reservation information.

According to a second aspect, an embodiment further provides a resource allocation apparatus, applied to a first network device. The apparatus includes: an obtaining unit configured to obtain target resource reservation information based on a plurality of transmitted first packets, where all of the plurality of first packets carry a same virtual network identifier, and the virtual network identifier is used to indicate that all the first packets are transmitted through a same virtual network; and an allocation unit configured to allocate a resource to the virtual network based on the target resource reservation information.

The obtaining unit includes a first obtaining unit and a second obtaining unit. The first obtaining unit is configured to obtain a resource parameter based on the plurality of transmitted first packets; and the second obtaining unit is configured to obtain the target resource reservation information based on the resource parameter.

Optionally, the resource parameter includes at least one of the following: a traffic peak and a traffic average, and the traffic peak and the traffic average each are obtained by the first network device by performing statistics collection based on the plurality of first packets; and the second obtaining unit is configured to obtain the target resource reservation information based on the traffic peak and/or the traffic average.

Optionally, the first obtaining unit is configured to obtain a feature information set of the plurality of first packets. The feature information set includes one or more pieces of feature information, and the resource parameter includes the feature information set.

Optionally, the second obtaining unit is configured to obtain the target resource reservation information based on a sum of resource requirements corresponding to all pieces of feature information in the feature information set.

Optionally, a resource requirement corresponding to each piece of feature information is carried in one or more first packets that are in the plurality of first packets and that correspond to the feature information, or a resource requirement corresponding to each piece of feature information is a preset resource requirement.

Optionally, the second obtaining unit is configured to obtain the target resource reservation information based on a product of a quantity of pieces of feature information in the feature information set and a preset resource requirement.

Optionally, the feature information includes a flow identifier, a user identifier, a 5-tuple, or a 7-tuple.

Optionally, the second obtaining unit is configured to obtain first resource reservation information based on the resource parameter.

The apparatus further includes a sending unit and a receiving unit. The sending unit is configured to send a first request to a control device. The first request includes the first resource reservation information, and the first request is used to indicate the control device to determine the target resource reservation information based on the first resource reservation information. The receiving unit is configured to receive a first message sent by the control device. The first message includes the target resource reservation information, and the first message is a response to the first request.

Optionally, the plurality of first packets correspond to a same destination node, the first request further includes an identifier of the destination node, the identifier of the destination node is used to determine information about a forwarding path from the first network device to the destination node based on the first resource reservation information, and the first message further includes the information about the forwarding path.

Optionally, the second obtaining unit is configured to obtain first resource reservation information based on the resource parameter.

The apparatus further includes a receiving unit configured to receive a second message from a second network device, where the second message includes second resource reservation information that is determined by the second network device and that corresponds to the virtual network.

The second obtaining unit is further configured to determine the target resource reservation information based on the first resource reservation information and the second resource reservation information.

Optionally, the apparatus further includes a sending unit configured to send a third message to the second network device, where the third message includes the first resource reservation information, and the third message is used to indicate the second network device to determine, based on the first resource reservation information, a resource that needs to be allocated to the virtual network.

Optionally, the apparatus further includes a sending unit configured to send a fourth message to a third network device, where the fourth message includes the target resource reservation information, and the fourth message is used to indicate the third network device to determine, based on the target resource reservation information, a resource that needs to be allocated to the virtual network. The third network device may be the foregoing second network device.

Optionally, the apparatus further includes a release unit configured to release the resource by the first network device if it is determined that no second packet including the virtual network identifier is obtained in a preset time period.

Optionally, the first network device transmits the plurality of first packets through a same communications interface; and the allocation unit is configured to allocate a resource of the communications interface to the virtual network based on the target resource reservation information.

Optionally, the virtual network includes a sliced network.

Optionally, the target resource reservation information includes one or more of bandwidth information and use duration information.

Optionally, the target resource reservation information further includes one or more of the following: physical interface information, logical interface information, and queue information.

Optionally, the apparatus further includes a transmission unit configured to transmit a second packet through the resource, where the second packet carries the virtual network identifier.

According to a third aspect, an embodiment further provides a network device. The network device includes at least one processor, the at least one processor is coupled to at least one memory, and the at least one processor is configured to execute a computer program or an instruction stored in the at least one memory, so that the network device performs the resource allocation method according to the first aspect.

According to a fourth aspect, an embodiment further provides a resource allocation system, and the system includes a network device and a control device. The network device is configured to obtain first resource reservation information based on a plurality of transmitted first packets, where all of the plurality of first packets carry a same virtual network identifier, and the virtual network identifier is used to indicate that all the first packets are transmitted through a same virtual network. The network device is further configured to send a first request to the control device, where the first request includes the first resource reservation information. The control device is configured to: receive the first request, determine the target resource reservation information based on the first resource reservation information in the first request, and send the first message to the network device, where the first message includes the target resource reservation information. The network device is further configured to: receive the first message sent by the control device, and allocate a resource to the virtual network based on the target resource reservation information.

According to a fifth aspect, an embodiment further provides a resource allocation system, and the system includes a first network device and a second network device. The first network device is configured to obtain first resource reservation information based on a plurality of transmitted first packets. All of the plurality of first packets carry a same virtual network identifier, and the virtual network identifier is used to indicate that all the first packets are transmitted through a same virtual network. The second network device is configured to send a second message to the first network device. The second message includes second resource reservation information that is determined by the second network device and that corresponds to the virtual network. The first network device is further configured to: receive the second message, determine the target resource reservation information based on the first resource reservation information and the second resource reservation information, and allocate a resource to the virtual network based on the target resource reservation information.

Optionally, the first network device is further configured to send a third message to the second network device, where the third message includes the first resource reservation information; and the second network device is further configured to: receive the third message, and determine, based on the first resource reservation information and the second resource reservation information, a resource that needs to be allocated to the virtual network.

According to a sixth aspect, an embodiment further provides a resource allocation system, and the system includes a first network device and a second network device. The first network device is configured to: obtain target resource reservation information based on a plurality of transmitted first packets, where all of the plurality of first packets carry a same virtual network identifier, and the virtual network identifier is used to indicate that all the first packets are transmitted through a same virtual network; and allocate a resource to the virtual network based on the target resource reservation information. The first network device is further configured to send a first message to the second network device, where the first message includes the target resource reservation information. The second network device is configured to: receive the first message, and allocate a resource to the virtual network based on the target resource reservation information in the first message.

According to a seventh aspect, an embodiment further provides a computer readable storage medium, including a computer program. When the computer program is run on a computer, the computer is enabled to perform the resource allocation method according to the first aspect.

According to an eighth aspect, an embodiment further provides a chip, including a processor and an interface circuit. The interface circuit is configured to receive an instruction and transmit the instruction to the processor. The processor is configured to perform the method according to the first aspect.

DETAILED DESCRIPTION

In a related technology, a resource allocated by a network device based on resource reservation information planned by a control device may not meet an actual requirement, and consequently, transmission efficiency is low; or the allocated resource may exceed an actual requirement, and consequently, a resource is wasted.

For example, there are two conventional path computation manners. One is centralized path computation in which a control device computes a forwarding path. The other is distributed path computation in which a head node computes a forwarding path. Currently, the latter manner is applied more widely. Especially, in a scenario such as an Internet of vehicles scenario in which a mobile terminal moves, a network device that establishes a connection to the mobile terminal changes with time. The distributed path computation can improve communication efficiency of the mobile terminal.

However, for the centralized path computation and the distributed path computation, a resource that needs to be allocated by a network device to a computed forwarding path based on resource reservation information delivered by a control device may not meet an actual resource requirement of an actual service.

Figure 1A:
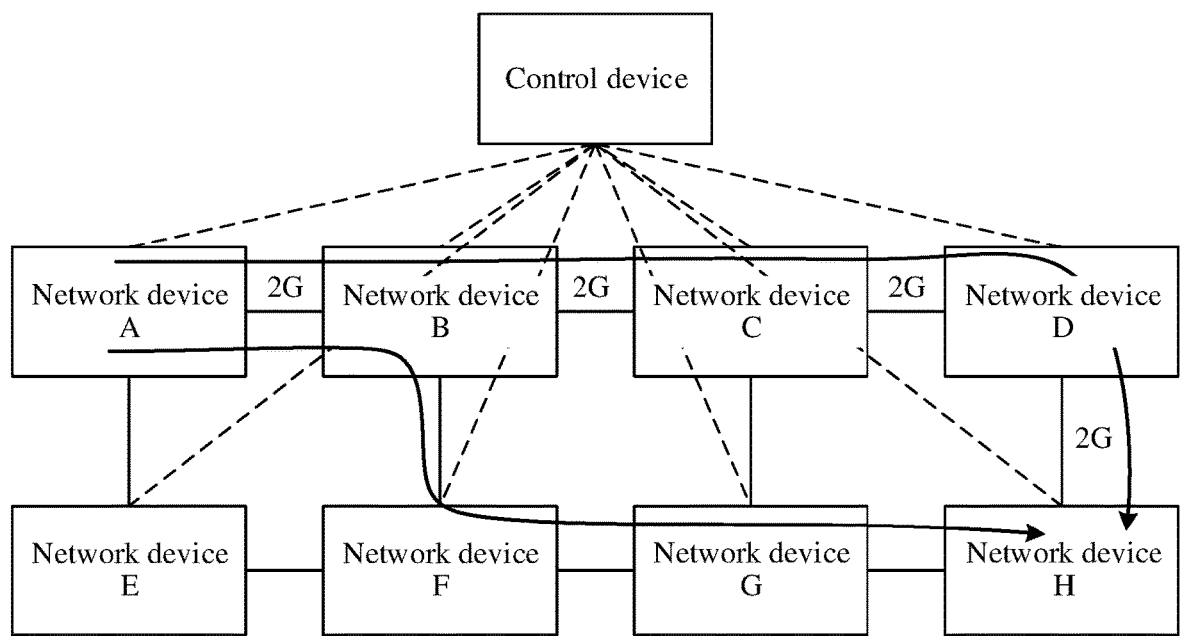
FIG. 1A is a schematic diagram of a network system according to an embodiment.

For example, FIG. 1A is a schematic diagram of a network system according to an embodiment. In the figure, the network system includes a network device A, a network device B, a network device C, a network device D, a network device E, a network device F, a network device G, a network device H, and a control device. Based on resource reservation information preplanned and delivered by the control device, the network device A, the network device B, the network device C, the network device D, and the network device H each allocate a logical interface with a 2G bandwidth to a same virtual network. The logical interface is configured to transmit a packet to a network device adjacent to the foregoing network device. To be specific, the network device A allocates a logical interface with a 2G bandwidth, and the logical interface is configured to send a packet of a virtual network Z to the network device B. Correspondingly, the network device B also allocates a logical interface that meets a 2G bandwidth and that is configured to receive the packet from the network device A. In addition, the network device B further allocates a logical interface that meets a 2G bandwidth and that is configured to send the packet of the virtual network Z to the network device C. Correspondingly, the network device C also allocates a logical interface that meets a 2G bandwidth and that is configured to receive the packet from the network device B. The rest can be deduced by analogy. In other words, theoretically, if the packet of the virtual network Z that requires the 2 G bandwidth needs to be transmitted, the packet may be forwarded on a preplanned forwarding path that meets the 2 G bandwidth, namely, the network device A→the network device B→the network device C→the network device D→the network device H.

In a possible case, when the network device A forwards a packet related to the virtual network Z on a forwarding path computed by a controller, a 3G bandwidth may be required. However, a device in the network reserves a resource based on the 2 G bandwidth. Consequently, an actual packet forwarding requirement cannot be met.

In another possible case, in an actual packet processing process, after the network device A cannot forward a packet based on a resource reserved by the controller, for example, after the forwarding path is faulty, the network device A may learn, through computation according to a shortest path method, that another forwarding path from the network device A to the network device H is: the network device A→the network device B→the network device F→the network device G→the network device H. The network device B does not allocate, according to a plan made in advance, a logical interface that meets a 2G bandwidth and that is configured to send the packet of the virtual network Z to the network device F, and the network device F and the network device G each do not allocate a logical interface that meets a 2G bandwidth and that is configured to transmit the packet of the virtual network Z. Therefore, actually, the forwarding path cannot be used to transmit the packet of the virtual network Z. In other words, a resource allocated by the network device in the network based on the resource reservation information planned by the control device cannot meet an actual requirement of transmitting the packet of the virtual network Z according to the shortest path method used for computation during actual network forwarding.

Embodiments of provide a resource allocation method and apparatus, to resolve a technical problem that a resource allocated by a network device does not match an actual requirement, and consequently, transmission efficiency is low or a resource is wasted in a conventional technology.

For ease of understanding, an application scenario of the embodiments is described first.

Figure 1B:
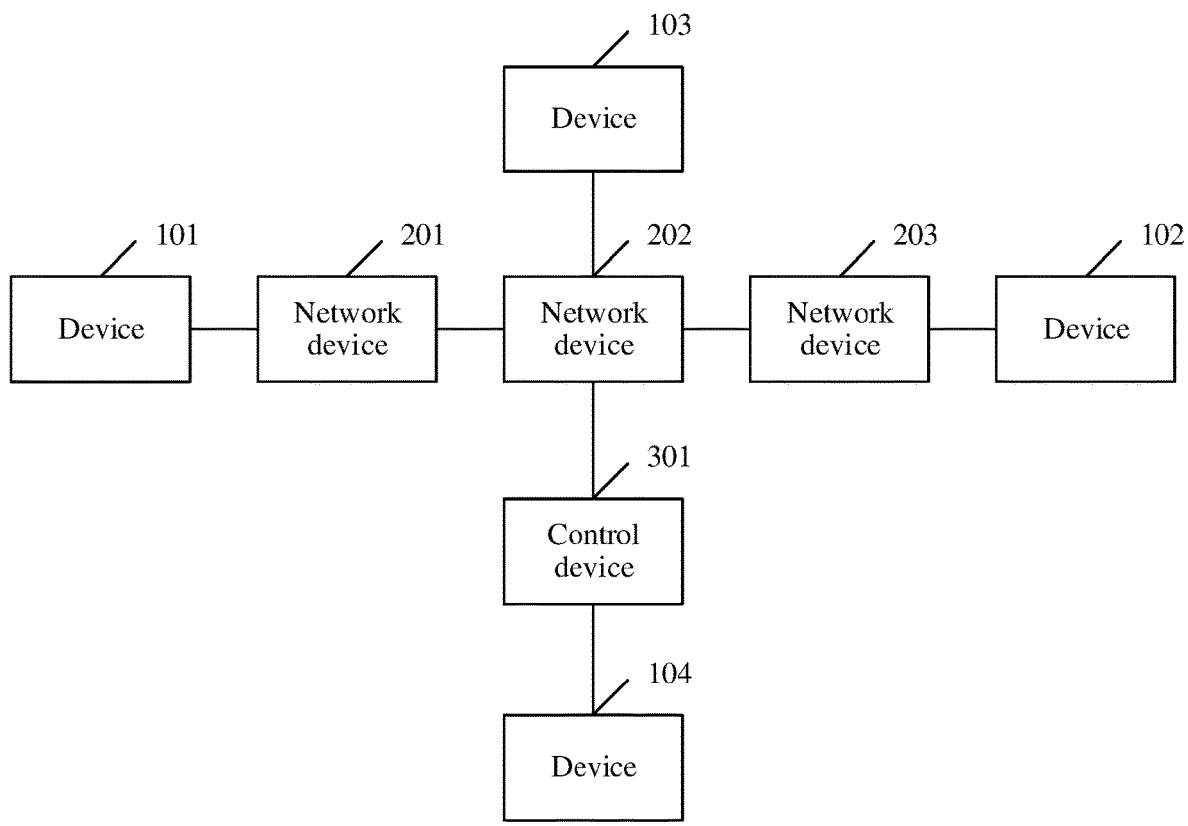
FIG. 1B is a schematic structural diagram of a resource reservation system according to an embodiment.

FIG. 1B is a schematic structural diagram of a resource reservation system according to an embodiment. In FIG. 1B, the resource reservation system includes a device 101, a device 102, a device 103, a device 104, a network device 201, a network device 202, a network device 203, and a control device 301. The device 101 is connected to the network device 201, the network device 201 is connected to the network device 202, the network device 202 is connected to the network device 203, the network device 203 is connected to the device 102, the device 103 is connected to the network device 202, the control device 301 is connected to the network device 201, the network device 202, and the network device 203, and the device 104 is connected to the control device 301.

The device 101, the device 102, the device 103, and the device 104 may be terminal devices, servers, or the like. The terminal device is also referred to as user equipment (UE), a mobile station (MS), a mobile terminal (MT), a terminal, or the like, and is a device that provides voice and/or data connectivity for a user, or a chip disposed in the device, for example, a handheld device or a vehicle-mounted device having a wireless connection function. Currently, some examples of the terminal device are a mobile phone, a desktop computer, a tablet computer, a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, a 5 G residential gateway (5 G-RG), and the like.

The network device 201, the network device 202, and the network device 203 each may be any entity or virtual device that has a routing and forwarding function, for example, a router or a switch, and are configured to forward a packet between the device 101 and the device 102.

The control device 301 may be a software-defined networking (SDN) controller, a path computation element, or the like, and is configured to control the foregoing network devices connected to the control device 301.

Figure 2A:
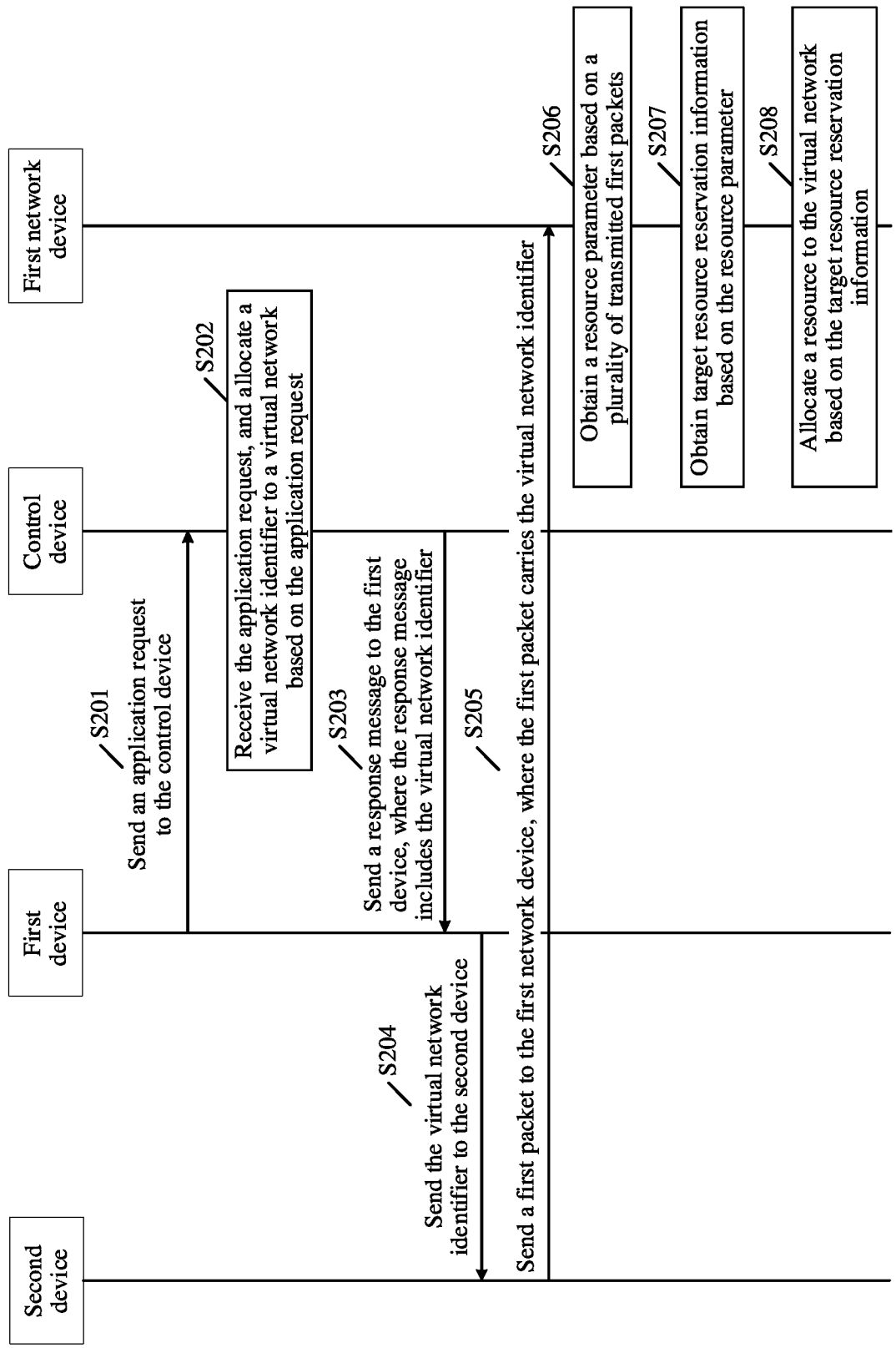
FIG. 2A is a flowchart of a resource allocation method according to an embodiment.

FIG. 2A is a flowchart of a resource allocation method according to an embodiment. The resource allocation method provided in this embodiment includes the following steps.

S201: A first device sends an application request to a control device.

In this embodiment, the first device in S201 may be, for example, the device 104 in the embodiment shown in FIG. 1B. A client for managing a virtual network may be installed on the first device, the client may generate the application request, and the application request is used to request to allocate a virtual network identifier to the virtual network.

In this embodiment, the virtual network may be, for example, a sliced network, and different sliced networks may implement different service requirements. For example, services that need to be supported by a network include a high-bandwidth service and a low-latency service, a sliced network 1 supports the high-bandwidth service, and a sliced network 2 supports the low-latency service. The high-bandwidth service is a service that has a relatively high requirement on a network bandwidth and a rate, for example, a 4K/8K ultra high-definition video service. The low-latency service such as self driving or an internet of vehicles requires ultra-low latency and high reliability.

Optionally, the application request may include one or more of a type of the virtual network, a service-level agreement (SLA), related information used to determine the following target resource reservation information, and the like. The type of the virtual network may be, for example, URLLC, eMBB, or mMTC. For the related information of the target resource reservation information, refer to the following description. Details are not described herein again.

S202: The control device receives the application request, and allocates a virtual network identifier to the virtual network based on the application request.

S203: The control device sends a response message to the first device, where the response message includes the virtual network identifier.

Optionally, when the application request includes the SLA, the control device may determine, according to the SLA, a flexible algorithm (FA) corresponding to the virtual network, and the control device sends a control message to a first network device. The control message includes the virtual network identifier and an identifier of the FA, and the identifier of the FA is used by the first network device to compute a forwarding path for the virtual network.

Optionally, when the application request further includes the related information used to determine the target resource reservation information, the control message may also include the related information, so that the first network device determines the target resource reservation information based on the related information.

After obtaining the virtual network identifier and the related information used to determine the target resource reservation information, the first network device may send the virtual network identifier and the related information to another network device in the network in a flooding manner, so that the another network device can also allocate a resource to the virtual network like the first network device.

S204: The first device sends the virtual network identifier to a second device.

In this embodiment, the second device may be, for example, the device 101 in the embodiment shown in FIG. 1B. A client of an application may be installed on the second device, and the application needs to transmit a packet through the virtual network corresponding to the virtual network identifier.

It should be noted that the first device and the second device may not be directly connected. For example, the first device and the second device may be connected through an intermediate device such as a server. The server may be a server on which a serving end of the application is installed. For example, the server may deliver configuration information to the second device. The configuration information carries the virtual network identifier, and the configuration information is used to indicate the second device to use a packet generated by the client of the application to carry the virtual network identifier.

In this embodiment, S201 to S204 are optional steps of the resource allocation method provided in this embodiment. These optional steps may be considered as a preparation for performing subsequent steps, and do not limit the resource allocation method.

S205: The second device sends a first packet to the first network device, where the first packet carries the virtual network identifier.

In this embodiment, the first network device may be, for example, one or more of the network device 201, the network device 202, and the network device 203 in FIG. 1B.

Optionally, the virtual network identifier may be carried in a packet header of the first packet. For example, if the first packet is an Internet Protocol version 6 (Ipv6) packet, the virtual network identifier may be carried in an Ipv6 extension header of the first packet.

S206: The first network device obtains a resource parameter based on a plurality of transmitted first packets.

In this embodiment, the plurality of first packets transmitted by the first network device include the first packet from the second device, and may further include a first packet from another device in addition to the first packet from the second device. The plurality of first packets may be from different sources, but a common feature of the plurality of first packets is that the plurality of first packets each carry the virtual network identifier.

In this embodiment, the plurality of transmitted first packets may be understood as three cases. In one case, the plurality of first packets are sent by the first network device. In another case, the plurality of first packets are received by the first network device. In still another case, the plurality of first packets are received and sent by the first network device.

When one or more first packets in the plurality of first packets are packets sent by the first network device, a forwarding path of the first packets may be generated by the first network device. Optionally, if the first network device receives the FA algorithm sent by the control device, the first network device may generate the forwarding path according to the FA algorithm, and transmit the first packet through the forwarding path. Optionally, after obtaining the forwarding path through computation, the first network device may encapsulate the received first packet by using information corresponding to the forwarding path, and forward the encapsulated first packet through the forwarding path. For example, in a segment routing version 6 (SRv6) scenario, the first network device may encapsulate, in the first packet, a virtual private network (VPN) segment ID (SID) corresponding to the forwarding path, and transmit the encapsulated first packet.

It should be noted that the first network device may compute a plurality of forwarding paths for a same virtual network, one forwarding path may be actually used, and the other forwarding paths are used as backup paths. Regardless of whether there are one or more forwarding paths, the resource allocation method provided in this embodiment may be used to allocate a resource corresponding to each forwarding path to the virtual network.

In this embodiment, all of the plurality of first packets carry a same virtual network identifier, and the virtual network identifier is used to indicate that all the first packets are transmitted through a same virtual network. When all of the plurality of first packets carry a same sliced network identifier, it indicates that the plurality of first packets are transmitted through a same sliced network. Before a corresponding resource is allocated to a specific sliced network, these first packets may be first transmitted through base network slicing.

For ease of description, the following provides descriptions by using an example in which the virtual network is a sliced network and the sliced network identifier is a slicing ID.

For example, Table 1 is an example of a correspondence between a slicing identifier and a sliced network.

TABLE 1

| Slicing identifier | Sliced network |
| --- | --- |
| Slicing ID 1 | Support a high-bandwidth service |
| Slicing ID 2 | Support a low-latency service |
| Slicing ID 0 | Basic sliced network |

It can be learned from Table 1 that a sliced network with the slicing ID 1 is a sliced network that supports the high-bandwidth service, a sliced network with the slicing ID 2 is a sliced network that supports the low-latency service, and a sliced network with the slicing ID 0 is a basic sliced network.

In addition, in this embodiment, the resource parameter is a parameter used by a network device to calculate a quantity of resources to be reserved for the virtual network, and reflects an actual resource requirement of the plurality of first packets. For example, the resource parameter may be obtained based on actual traffic of the plurality of first packets, and the actual traffic reflects the actual resource requirement of the plurality of first packets.

In a possible implementation, the resource parameter includes at least one of a traffic peak and a traffic average of the plurality of first packets. The plurality of first packets may be packets in one or more flows, the traffic peak is a maximum value of traffic of a flow corresponding to the plurality of first packets, and the traffic average is an average value of traffic of the flow corresponding to the plurality of first packets in a period of time.

In another possible implementation, the resource parameter is a feature information set of the plurality of first packets. Specifically, the feature information set includes one or more pieces of feature information. The feature information is information that represents a packet feature. The feature information may be used to identify one or more flows, or may be used to identify a user. When the feature information is used to identify one or more flows, the feature information may be, for example, one or more of a flow ID, a triplet, a 5-tuple, or a 7-tuple. When the feature information is used to identify a user, the feature information may be a user ID. The user identifier may be an account name of a corresponding application of the user, an identifier of a terminal device, or the like. This is not specifically limited in this embodiment.

Certainly, the foregoing content does not limit the resource parameter, and a person skilled in the art may automatically design the resource parameter based on an actual requirement.

S207: The first network device obtains the target resource reservation information based on the resource parameter.

After obtaining the resource parameter based on the plurality of first packets, the first network device obtains the target resource reservation information based on the resource parameter. In this embodiment, the target resource reservation information may be, for example, one or more of bandwidth information, use duration information, and the like.

The bandwidth information is information that represents a bandwidth, and may be directly a bandwidth value, or may be a bandwidth class or the like. One bandwidth class may correspond to one bandwidth value, or may correspond to one bandwidth range. For example, a class-A bandwidth indicates that the bandwidth is 100 G, or indicates that the bandwidth falls within a range from 100 G to 400 G.

The use duration information is information about duration of use of the virtual network, and may be directly a value of use duration, or may be a priority of use duration or the like. The use duration information may also be referred to as a slot. The priority of the use duration may correspond to a value of the use duration, or may correspond to a range of the use duration. For example, a high priority of the use duration indicates that the use duration is 10 seconds, or indicates that the use duration falls within a range from 8 seconds to 12 seconds. For another example, a physical interface corresponds to two sliced networks, that is, a sliced network 1 and a sliced network 2. Duration in which the sliced network 1 uses the physical interface each time is 10 seconds, and duration in which the sliced network 2 uses the physical interface each time is 20 seconds. At one moment, the physical interface can be used by only one sliced network, and cannot be used by the other sliced network.

Optionally, the target resource reservation information may further include one or more of physical interface information, logical interface information, queue information, and the like. The physical interface information may be, for example, a physical interface identifier, the logical interface information may be, for example, a logical interface identifier, and the queue information may be, for example, a queue identifier.

In this embodiment, a manner of obtaining the target resource reservation information varies with a type of the resource parameter.

For example, when the resource parameter includes at least one of the traffic peak and the traffic average of the plurality of first packets, the target resource reservation information is obtained based on the at least one of the traffic peak and the traffic average of the plurality of first packets. For example, if the resource parameter is the traffic peak or the traffic average, the target resource reservation information may be obtained based on a product of the traffic peak and a weight or a product of the traffic average and a weight. If the resource parameter is the traffic peak and the traffic average, the target resource reservation information may be obtained according to the following formula: a×traffic peak+ b×traffic average. Herein, a and b are coefficients.

For another example, when the resource parameter is the feature information set of the plurality of first packets, the first network device may obtain the target resource reservation information based on a sum of resource requirements corresponding to all pieces of feature information in the feature information set. The resource requirement may be carried in one or more first packets that are in the plurality of first packets and that correspond to the feature information, or the resource requirement corresponding to the feature information may not be carried in the first packet, but is a preset resource requirement. The network device may obtain a related preset resource requirement by receiving a message sent by the control device, or a network administrator may preconfigure a related preset resource requirement on the network device through a configuration interface. Alternatively, the first network device may obtain the target resource reservation information based on a product of a quantity of pieces of feature information and a preset resource requirement. The target resource reservation information obtained in each of the two manners can reflect an actual requirement of the virtual network to some extent.

The first network device may calculate the target resource reservation information based on the resource parameter, or may calculate first resource reservation information based on the resource parameter, and send the first resource reservation information to the control device (the control device may be, for example, the control device 301 in FIG. 1B). The control device calculates the target resource reservation information based on the first resource reservation information. Alternatively, the first network device may send the resource parameter to the control device, and the control device calculates the target resource reservation information based on the resource parameter. Then, the first network device receives the target resource reservation information sent by the control device. Alternatively, the first network device may send the first resource reservation information to another network device connected to the first network device, and obtain the target resource reservation information through negotiation with the another network device.

In the second case, specifically, the first network device sends a first request to the control device. The first request includes the first resource reservation information, and the first request is used to indicate the control device to determine the target resource reservation information based on the first resource reservation information. After receiving the first request, the control device determines the target resource reservation information based on the first resource reservation information, and sends a first message to the first network device. The first message includes the target resource reservation information. The first network device receives the first message, and obtains the target resource reservation information from the first message. In this embodiment, the target resource reservation information may be the same as or different from the first resource reservation information. The control device determines the target resource reservation information based on the first resource reservation information. For example, the control device may weight the first resource reservation information to obtain the target resource reservation information. A weight may be greater than or equal to 1, or may be less than 1. Alternatively, the control device may obtain first resource reservation information sent by a network device other than the first network device on a forwarding path of the first packet, and then determine the target resource reservation information based on first resource reservation information sent by a plurality of network devices. For example, when the first resource reservation information is first bandwidth information, and the target resource reservation information is target bandwidth information, the control device may use, as the target bandwidth information, an average value of the first bandwidth information sent by the plurality of network devices, or use maximum first bandwidth information as the target bandwidth information. Certainly, the foregoing manners do not limit the technical solutions of this disclosure, and a person skilled in the art may design the technical solutions based on an actual requirement.

In this embodiment, when the plurality of first packets correspond to a same destination node, the first request further includes an identifier of the destination node. The control device may determine information about a forwarding path from the first network device to the destination node based on the first resource reservation information and the identifier of the destination node. In this embodiment, the information about the forwarding path may be path information that is used to indicate the first network device to forward the first packet, for example, an SID or an outbound interface information.

It should be noted that theoretically, the forwarding path needs to meet a resource allocation requirement corresponding to the first resource reservation information. However, if no forwarding path meets the resource allocation requirement corresponding to the first resource reservation information regardless of a computation manner in an actual case, the control device may determine the target resource reservation information based on the first resource reservation information, and compute the forwarding path based on the target resource reservation information. Although the target resource reservation information is less than the first resource reservation information, the target resource reservation information needs to be as close as possible to the first resource reservation information, so that the computed forwarding path can reduce packet transmission efficiency as much as possible.

In addition, optionally, in this embodiment, the first network device may determine the target resource reservation information based on the resource parameter and the related information from the control device for determining the target resource reservation information. For example, the related information may be the foregoing coefficients a and b, or the foregoing preset resource requirement.

S206 and S207 are merely an example in which the first network device obtains the target resource reservation information based on the plurality of transmitted first packets. The method for obtaining, by the first network device, the target resource reservation information based on the plurality of transmitted first packets may alternatively be that the first network device directly obtains the target resource reservation information based on information about the plurality of first packets, and does not need to extract the resource parameter and the like based on the plurality of first packets.

S208: The first network device allocates a resource to the virtual network based on the target resource reservation information.

After obtaining the target resource reservation information, the first network device allocates the resource to the corresponding virtual network based on the target resource reservation information. In this embodiment, a process in which the first network device allocates the resource may be understood as a case of obtaining a resource object having resource content. The resource object may be, for example, a physical interface, a logical interface, or a packet queue. The resource content may be, for example, a bandwidth or use duration. The resource object and the resource content may be combined in a plurality of manners. The manners may be automatically determined by a person skilled in the art according to an actual situation. Details are not described herein.

A specific method in which the first network device allocates the resource to the virtual network needs to be determined based on the target resource reservation information, the resource object, and the resource content. If the target resource reservation information includes bandwidth information, the resource object is a physical interface, and the resource content is a bandwidth corresponding to the bandwidth information, that the first network device allocates the resource to the virtual network may be: determining, as a physical interface corresponding to the virtual network, a physical interface that meets the bandwidth corresponding to the bandwidth information. If the target resource reservation information includes logical interface information and bandwidth information, the resource object is a logical interface corresponding to the logical interface information, the logical interface is, for example, a channelized sub-interface or a flexible Ethernet (Flex-E) sub-interface, and the resource content is a bandwidth corresponding to the bandwidth information. In this case, that the first network device allocates the resource to the virtual network may be: creating a logical interface that meets the bandwidth corresponding to the bandwidth information. If the target resource reservation information includes physical interface information and use duration information, the resource object is a physical interface corresponding to the physical interface information, and the resource content is use duration corresponding to the use duration information. That the first network device allocates the resource to the virtual network may be: allocating, to the virtual network, corresponding use duration in which the virtual network uses the physical interface.

In this embodiment, the target resource reservation information used to allocate the resource is not obtained through planning as in a conventional manner, but is obtained based on an actual resource parameter of the plurality of first packets. This means that the target resource reservation information is obtained based on an actual requirement. Therefore, not only a problem that transmission efficiency is low because a quantity of allocated resources is less than an actual requirement in the conventional manner is resolved, but also a problem that a resource is wasted because a quantity of allocated resources is greater than an actual requirement in the conventional manner is resolved.

For example, in an application scenario of distributed path computation shown in FIG. 1B, after computing a corresponding forwarding path for a virtual network Z according to a shortest path method, the network device A may first send a packet of the virtual network Z through the forwarding path based on base network slicing. Network devices on the forwarding path, namely, the network device A, the network device B, the network device F, the network device G, and the network device H, each may perform S201 to S203 to allocate a resource to the virtual network Z. If the virtual network Z requires a 2G bandwidth to forward the packet, the network devices on the forwarding path each may perform S201 to S203, to create a logical interface with a 2G bandwidth for the virtual network Z, and then transmit the packet of the virtual network Z through the logical interface. In this way, the resource allocated by the network device to the virtual network Z can meet an actual requirement.

In addition, S201 to S203 in the foregoing method may be applied to a scenario in which a resource is allocated to a virtual network for the first time, or may be applied to a scenario in which a resource is reallocated to a virtual network to which a resource has been allocated.

Therefore, optionally, in this embodiment, the first network device may periodically perform S201 to S203. For example, one hour is used as one period. If target resource reservation information obtained by performing S203 in a current period is different from target resource reservation information obtained in a previous period, or an absolute value of a difference between the two pieces of target resource reservation information exceeds a threshold, a resource may be reallocated to the corresponding virtual network based on the target resource reservation information obtained in the current period.

Optionally, when a first communications interface of the first network device is connected to a second communications interface of a second network device, target resource reservation information of the first communications interface and target resource reservation information of the second communications interface for a same virtual network identifier may be the same, to ensure consistency of packet transmission efficiency. The second network device and the first network device may be adjacent or may not be adjacent. For example, when the first network device is a head node, the second network device may be a node adjacent to the head node, or may be a node not adjacent to the head node.

Specifically, the first network device may obtain the first resource reservation information based on the resource parameter corresponding to the virtual network identifier. Likewise, the second network device may obtain second resource reservation information based on the resource parameter corresponding to the virtual network identifier, and send a second message to the first network device. The second message includes the second resource reservation information that is determined by the second network device and that corresponds to the virtual network identifier. It should be noted that the second resource reservation information represents a resource requirement of a plurality of second packets transmitted between the second network device and the first network device. The second packet includes the virtual network identifier in the first packet. In actual application, the second packet may be the first packet, or may not be the first packet. Specifically, when the first communications interface sends the first packet to the second communications interface, the first network device may determine the first resource reservation information of the first packet sent by the first communications interface. Correspondingly, the second network device receives the first packet, and the second network device may determine the second resource reservation information of the first packet received from the first network device. In this case, the second packet transmitted by the second network device is actually the first packet. When the first communications interface receives the first packet sent by the second communications interface, the first network device may determine the first resource reservation information of the first packet received from the first communications interface. Correspondingly, the second network device may determine the second resource reservation information of the first packet sent to the first network device. In this case, the second packet transmitted by the second network device is actually also the first packet. When the first communications interface sends the first packet to the second communications interface, and the second communications interface sends the second packet to the first communications interface, the first packet is different from the second packet. For example, in this scenario, the first packet may be a request packet, and the second packet may be a response packet. In this case, the first packet and the second packet have a same virtual network identifier, but have different packet content. In this case, the first network device may determine the first resource reservation information of the first packet sent to the second communications interface, and the second network device may determine the second resource reservation information of the second packet sent to the first communications interface.

After receiving the second message from the second network device, the first network device determines the target resource reservation information based on the first resource reservation information and the second resource reservation information, for example, uses a larger value in the first resource reservation information and the second resource reservation information as the target resource reservation information, or uses an average value of the first resource reservation information and the second resource reservation information as the target resource reservation information.

In addition, for a manner in which the second network device obtains the first resource reservation information or the second resource reservation information based on the resource parameter, refer to the foregoing implementation of obtaining the target resource reservation information based on the resource parameter. Details are not described herein again.

After obtaining the first resource reservation information, the first network device may send a third message to the second network device. The third message includes the first resource reservation information, and the third message is used to indicate the second network device to determine, based on the first resource reservation information, a resource that needs to be allocated to the virtual network. In other words, the second network device may obtain, based on the first resource reservation information and the second resource reservation information, the target resource reservation information determined by the second network device for the virtual network, and allocate the resource to the virtual network based on the target resource reservation information. The target resource reservation information of the first network device needs to be the same as the target resource reservation information of the second network device, to ensure resource allocation consistency.

Optionally, after obtaining the target resource reservation information, the first network device may further send a fourth message to a third network device (the third network device may be the second network device). The fourth message includes the target resource reservation information. In this way, the second network device does not need to perform computation based on the first resource reservation information and the second resource reservation information, but may directly allocate the resource to the virtual network based on the target resource reservation information.

In this embodiment, the second message, the third message, and the fourth message may be, for example, interior gateway protocol (IGP) hello messages.

In addition, optionally, after allocating the resource to the virtual network, when obtaining a second packet carrying the virtual network identifier corresponding to the virtual network, the first network device may transmit the second packet by using the resource allocated to the virtual network. In this way, the packet is transmitted by using the resource matching the virtual network. Specifically, the first network device may pre-generate a correspondence between a virtual network identifier and a resource identifier. In this way, after receiving the second packet including the virtual network identifier, the first network device may determine an identifier of the corresponding resource based on the virtual network identifier and the correspondence, and then send the second packet through the resource corresponding to the identifier of the resource.

After the first network device allocates the corresponding resource to the virtual network based on the target resource reservation information, if the first network device obtains, in a preset time period, no second packet including the virtual network identifier, it indicates that the virtual network corresponding to the virtual network identifier has no transmission requirement or temporarily has no transmission requirement. In this case, the first network device may release the resource corresponding to the virtual network identifier, to better save resources. Releasing the resource corresponding to the virtual network identifier may be, for example, deleting a logical interface or a queue allocated to the virtual network, and may also be deleting the correspondence between a virtual network identifier and a resource identifier.

In addition, it should be noted that in this embodiment, another network device on the forwarding path may allocate a resource to the virtual network with reference to the steps performed by the first network device in S206 to S208. Alternatively, if the first network device is a head node, after obtaining the target resource reservation information, the first network device may send a correspondence between the virtual network identifier and the target resource reservation information to another network device on the forwarding path, so that the another network device may allocate a resource to the virtual network based on the target resource reservation information. In this way, a time used by the another network device to compute the target resource reservation information is reduced, and resource allocation efficiency is improved.

Figure 2B:
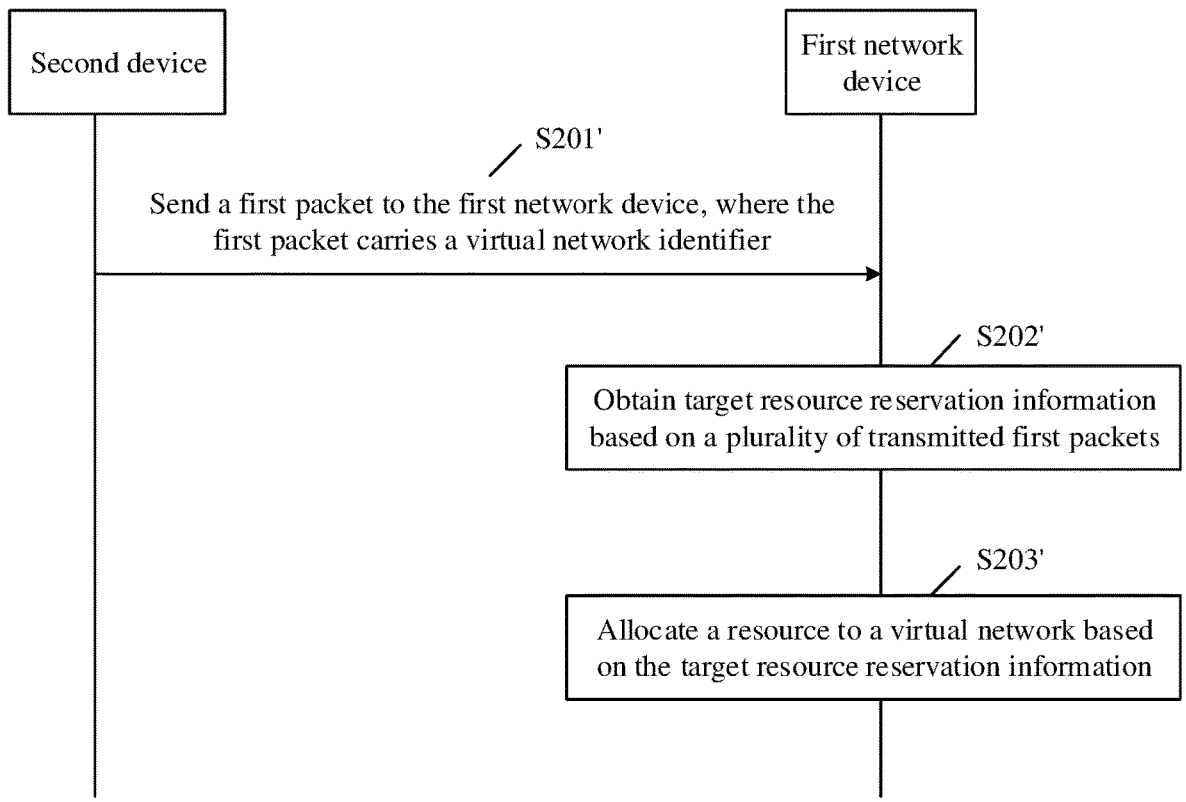
FIG. 2B is a flowchart of a resource allocation method according to an embodiment.

S201, S202, S203, and S204 are optional steps, and are merely used as an example provided in this embodiment. In this embodiment, how to obtain information such as the virtual network identifier, the flow identifier, or the user identifier in the plurality of first packets obtained by the first network device is not limited. In other words, FIG. 2B is a main flowchart of the method in this embodiment.

The method includes the following steps:

S201': A second device sends a first packet to a first network device, where the first packet carries a virtual network identifier.

S202': The first network device obtains target resource reservation information based on a plurality of transmitted first packets, where all of the plurality of first packets carry a same virtual network identifier, and the virtual network identifier is used to indicate that all the first packets are transmitted through a same virtual network.

S203': The first network device allocates a resource to the virtual network based on the target resource reservation information.

For detailed content of the method, refer to the foregoing embodiment corresponding to FIG. 2A. Details are not described herein again.

To better understand the resource allocation method provided in the embodiments, the following provides descriptions with reference to several application scenarios.

Figure 3:
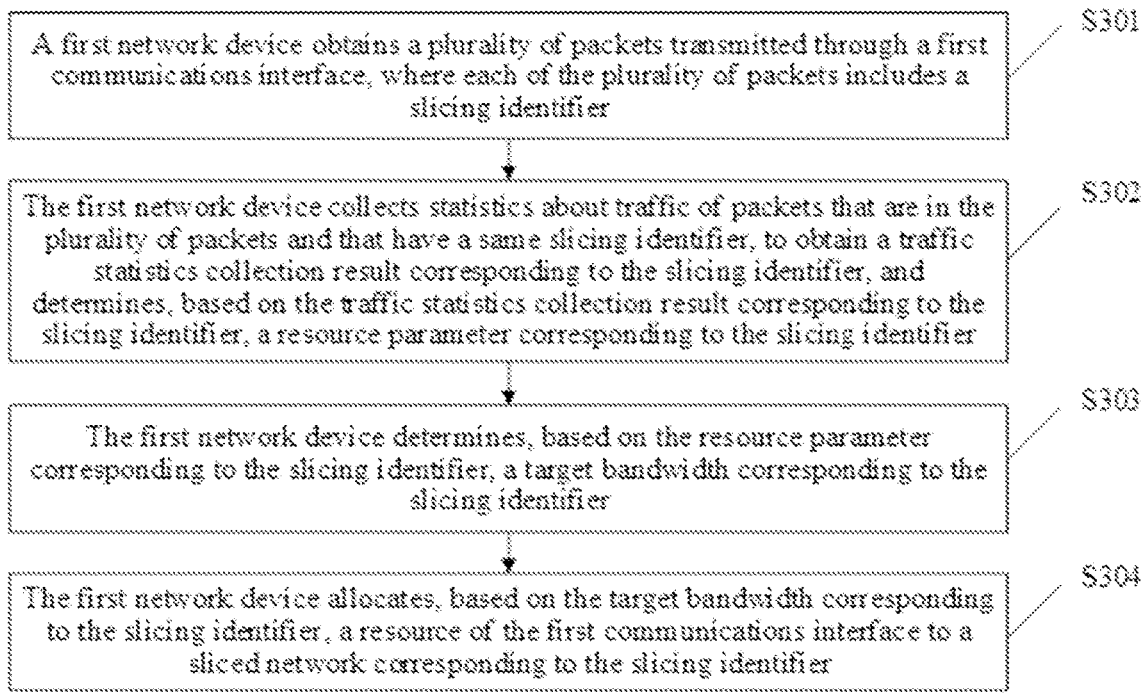
FIG. 3 is a flowchart of a first application scenario of a resource allocation method according to an embodiment.

FIG. 3 is a flowchart of a first application scenario of a resource allocation method according to an embodiment.

In FIG. 3, the resource allocation method provided in this embodiment includes the following steps.

S301: A first network device obtains a plurality of packets transmitted through a first communications interface, where each of the plurality of packets includes a slicing identifier.

In this embodiment, the first network device may be, for example, one or more of the network device 201, the network device 202, and the network device 203 in FIG. 1B.

In this embodiment, the plurality of packets transmitted through the first communications interface may be understood as three cases. In one case, the first network device sends the plurality of packets to a second network device through the first communications interface. In another case, the first network device receives, through the first communications interface, the plurality of packets sent by a second network device. In still another case, the first network device sends a plurality of packets to a second network device through the first communications interface, and receives, through the first communications interface, a plurality of packets sent by the second network device.

The plurality of packets in this embodiment may be from the device 101 in FIG. 1B. Each of the plurality of packets includes a slicing identifier, and the slicing identifier is used to identify a sliced network.

S302: The first network device collects statistics about traffic of packets that are in the plurality of packets and that have a same slicing identifier, to obtain a traffic statistics collection result corresponding to the slicing identifier, and determines, based on the traffic statistics collection result corresponding to the slicing identifier, a resource parameter corresponding to the slicing identifier.

In this embodiment, the plurality of packets transmitted through the first communications interface may include different slicing identifiers. In other words, the plurality of packets transmitted through the first communications interface may correspond to different sliced networks. Therefore, the first network device may collect statistics about traffic of packets (namely, the foregoing plurality of first packets) having a same slicing identifier, that is, collect statistics about traffic of each sliced network corresponding to the first communications interface, to obtain a traffic statistics collection result corresponding to the sliced network.

For example, identifier information included in the plurality of packets transmitted through the first communications interface is a slicing ID 1 and a slicing ID 2. The first network device separately collects statistics about traffic of a packet including the slicing ID 1 and traffic of a packet including the slicing ID 2. Table 2 shows a traffic statistics collection result obtained by the first network device by separately collecting statistics about the traffic of the packet including the slicing ID 1 and the traffic of the packet including the slicing ID 2 at each second in 10 consecutive seconds.

TABLE 2

| Statistics collection period | Slicing ID 1 | Slicing ID 2 |
|---|---|---|
| $1^{st}$ second | 10M | 30M |
| $2^{nd}$ second | 15M | 29M |
| $3^{rd}$ second | 12M | 30M |
| $4^{th}$ second | 12M | 31M |
| $5^{th}$ second | 13M | 32M |
| $6^{th}$ second | 12M | 33M |
| $7^{th}$ second | 14M | 32M |
| $8^{th}$ second | 11M | 32M |
| $9^{th}$ second | 10M | 30M |
| $10^{th}$ second | 12M | 29M |

In this embodiment, the resource parameter may be at least one of a traffic peak and a traffic average. Table 2 is used as an example. The first network device may learn, based on a traffic statistics collection result of a packet whose slicing identifier is the slicing ID 1, that a traffic peak in the 10 seconds is 15M and a traffic average in the 10 seconds is 12.1M; and learn, based on a traffic statistics collection result of a packet whose slicing identifier is the slicing ID 2, that a traffic peak in the 10 seconds is 33M and a traffic average in the 10 seconds is 30.8M.

S303: The first network device determines, based on the resource parameter corresponding to the slicing identifier, a target bandwidth corresponding to the slicing identifier.

In this embodiment, target resource reservation information may be specifically the target bandwidth. The target bandwidth belongs to the foregoing bandwidth information, and may be considered as a specific bandwidth value. There may be a plurality of manners of determining the target bandwidth based on the resource parameter. This is not specifically limited in this embodiment. The following provides descriptions by using several implementations as examples.

If the resource parameter is the traffic peak or the traffic average, the target resource reservation information may be a product of the traffic average and a weight or a product of the traffic average and a weight. For example, if a traffic peak corresponding to the slicing identifier slicing ID 1 is 15M, a target bandwidth corresponding to the slicing ID 1 may be 15M×90%=13.5M. For another example, if a traffic average corresponding to the slicing identifier slicing ID 2 is 30.8M, a target bandwidth corresponding to the slicing ID 2 may be 30.8M×100%=30.8M.

If the resource parameter is the traffic peak and the traffic average, the target bandwidth may be equal to: a×traffic peak+b×traffic average. Herein, a and b are coefficients. For example, if a traffic peak corresponding to the slicing identifier slicing ID 1 is 15M, and a traffic average is 12.1M, a target bandwidth corresponding to the slicing ID 1 may be 0.5×15M+0.5×12.1M=13.55M. If rounding up is performed, the target bandwidth corresponding to the slicing ID 1 may be 14M. For another example, if a traffic peak corresponding to the slicing identifier slicing ID 2 is 33M, and a traffic average is 30.8M, a target bandwidth corresponding to the slicing ID 2 may be 0.3×33M+0.7×30.8M=31.46M. If rounding off is performed, the target bandwidth corresponding to the slicing ID 2 may be 31M.

A manner of calculating a target bandwidth of a sliced network based on at least one of the traffic peak and the traffic average does not constitute a limitation on the technical solutions of this disclosure. A person skilled in the art may further automatically design the technical solutions based on a specific situation.

S304: The first network device allocates, based on the target bandwidth corresponding to the slicing identifier, a resource of the first communications interface to a sliced network corresponding to the slicing identifier.

In this embodiment, the resource of the first communications interface may be, for example, bandwidth of a physical sub-interface, a logical sub-interface, or a packet queue of the first communications interface. That the first network device allocates the resource of the first communications interface based on the target bandwidth means that the target bandwidth is allocated to the first communications interface. If the first communications interface is a physical sub-interface, that the first network device allocates the resource of the first communications interface may be: determining, as a physical sub-interface for transmitting a packet of the sliced network corresponding to the slicing identifier, a physical sub-interface that meets the target bandwidth. If the first communications interface is a logical sub-interface, that the first network device allocates the resource of the first communications interface may be: creating a logical sub-interface corresponding to the target bandwidth. If the first communications interface is a packet queue, that the first network device allocates the resource of the first communications interface may be: creating a packet queue corresponding to the target bandwidth.

Optionally, the first network device may generate a correspondence between a slicing identifier and an identifier of a first communications interface. In this way, after receiving a second packet including the slicing identifier, the first network device may determine, based on the slicing identifier and the correspondence, an identifier that is of a first communications interface and that corresponds to the slicing identifier, and then send the second packet through the first communications interface corresponding to the identifier.

For example, after creating the logical sub-interface corresponding to the target bandwidth for the sliced network, the first network device may generate a correspondence between a slicing identifier of the sliced network and an identifier of the logical sub-interface. After receiving a second packet including the slicing identifier, the first network device may obtain a corresponding identifier of a logical sub-interface based on the correspondence, and send the second packet through the logical sub-interface corresponding to the identifier of the logical sub-interface.

Optionally, the correspondence may further include a target bandwidth, that is, may be a correspondence among a slicing identifier, an identifier of a first communications interface, and a target bandwidth.

Table 3 is an example of a correspondence among a slicing identifier in Table 1 and Table 2, an identifier of a Flex-E sub-interface, and a target bandwidth.

TABLE 3

| Slicing identifier | Identifier of a Flex-E sub-interface | Target bandwidth |
| --- | --- | --- |
| Slicing ID 1 | Flex-E ID 1 | 14M |
| Slicing ID 2 | Flex-E ID 2 | 31M |

It can be learned from Table 3 that a Flex-E sub-interface corresponding to the slicing ID 1 is the Flex-E ID 1, a target bandwidth corresponding to the sub-interface is 14M, a Flex-E sub-interface corresponding to the slicing ID 2 is a Flex-E ID 2, and a target bandwidth corresponding to the sub-interface is 31M.

After receiving a packet including the slicing ID 1, the first network device may obtain the Flex-E ID 1 based on the slicing ID 1 and Table 3, and then forward the packet through the sub-interface that corresponds to 14M and that has the identifier Flex-E ID 1.

In this embodiment, statistics about the traffic of the packets that are transmitted through the first communications interface and that belong to a same sliced network are collected, the resource parameter is obtained based on the traffic statistics collection result, and then the target bandwidth is obtained based on the resource parameter. Therefore, the resource of the first communications interface is allocated based on the target bandwidth. Because the target bandwidth is obtained based on actual packet traffic, but is not planned in advance, packet transmission efficiency is ensured, and a resource waste is avoided.

Figure 4:
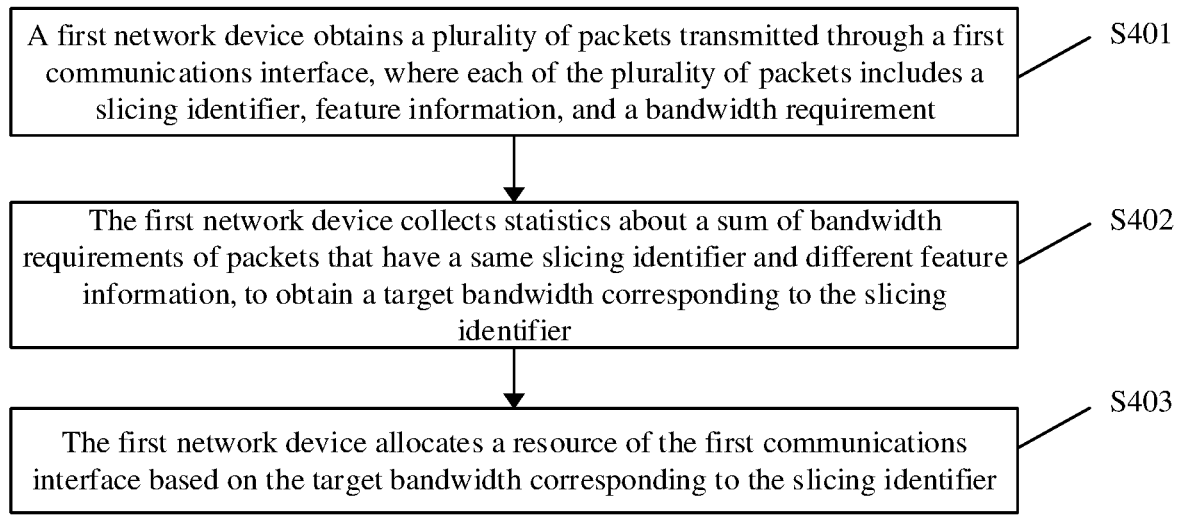
FIG. 4 is a flowchart of a second application scenario of a resource allocation method according to an embodiment.

FIG. 4 is a flowchart of a second application scenario of a resource allocation method according to an embodiment.

In FIG. 4, the resource allocation method provided in this embodiment includes the following steps.

S401: A first network device obtains a plurality of packets transmitted through a first communications interface, where each of the plurality of packets includes a slicing identifier, feature information, and a bandwidth requirement.

In this embodiment, for the slicing identifier and the feature information, refer to the foregoing descriptions. Details are not described herein again. The bandwidth requirement may be considered as a possible implementation of the foregoing resource requirement.

S402: The first network device collects statistics about a sum of bandwidth requirements of packets that have a same slicing identifier and different feature information, to obtain a target bandwidth corresponding to the slicing identifier.

In this embodiment, each packet includes a corresponding bandwidth requirement. When the feature information indicates a flow, the bandwidth requirement is a bandwidth requirement of a flow to which the packet belongs. When the feature information indicates a user, the bandwidth requirement is a bandwidth requirement of a user corresponding to the packet.

In this embodiment, the first network device collects statistics about the sum of the bandwidth requirements of the packets that have the same slicing identifier and the different feature information, to obtain the sum of the bandwidth requirements. The first network device obtains the target bandwidth based on the sum of the bandwidth requirements. The target bandwidth is a possible implementation of the foregoing target resource reservation information. Specifically, the target bandwidth may be equal to the sum of the bandwidth requirements, or may not be equal to the sum of the bandwidth requirements. For example, the target bandwidth is a product of the sum of the bandwidth requirements and a weight that is not equal to 1. It may be understood that if the target bandwidth is not equal to the sum of the bandwidth requirements, the target bandwidth still needs to be close to the sum of the bandwidth requirements as much as possible, so that the target bandwidth can represent an actual bandwidth requirement of the sliced network.

For example, Table 4 is an example of a correspondence among a slicing identifier, a flow identifier, and a bandwidth requirement.

TABLE 4

| Slicing identifier | Flow identifier | Bandwidth requirement |
| --- | --- | --- |
| Slicing ID 1 | Flow ID 1 | 20M |
|  | Flow ID 2 | 50M |
| Slicing ID 2 | Flow ID 3 | 30M |
|  | Flow ID 4 | 70M |
|  | Flow ID 5 | 20M |

It can be learned from Table 4 that packets including the slicing ID 1 are from two flows, and flow identifiers of the two flows are respectively the flow ID 1 and the flow ID 2. In this case, a sum of bandwidth requirements corresponding to the two flows is 20M+50M=70M. In other words, a bandwidth requirement of a sliced network corresponding to the slicing ID 1 is 70M. Packets including the slicing ID 2 are from three flows, and flow identifiers of the three flows are respectively the flow ID 3, the flow ID 4, and the flow ID 5. In this case, a sum of bandwidth requirements corresponding to the three flows is 30M+70M+20M=120M. In other words, a bandwidth requirement of a sliced network corresponding to the slicing ID 2 is 120M.

For another example, Table 5 is an example of a correspondence among a slicing identifier, a user identifier, and a bandwidth requirement.

TABLE 5

| Slicing identifier | User identifier | Bandwidth requirement |
| --- | --- | --- |
| Slicing ID 1 | User ID 1 | 10M |
|  | User ID 2 | 50M |
|  | User ID 3 | 30M |
| Slicing ID 2 | User ID 1 | 60M |
|  | User ID 4 | 20M |

It can be learned from Table 5 that user identifiers corresponding to the slicing ID 1 include the user ID 1, the user ID 2, and the user ID 3. In this case, a sum of bandwidth requirements corresponding to the three user identifiers is 10M+50M+30M=90M. In other words, a sum of bandwidth requirements corresponding to the slicing ID 1 is 90M. User identifiers corresponding to the slicing ID 2 include the user ID 1 and the user ID 4. In this case, a sum of bandwidth requirements corresponding to the two user identifiers is a sum of 60M and 20M. In other words, a sum of bandwidth requirements corresponding to the slicing ID 2 is 80M.

S403: The first network device allocates a resource of the first communications interface based on the target bandwidth corresponding to the slicing identifier.

In this embodiment, for a related description of allocating the resource of the first communications interface, refer to the foregoing descriptions. Details are not described herein again.

In this embodiment, because an actual bandwidth requirement is carried in a packet, the first network device determines a target bandwidth based on bandwidth requirements of packets belonging to a same sliced network, and reserves a resource based on the target bandwidth. In this way, packet transmission efficiency is ensured, and a resource waste is avoided.

Figure 5:
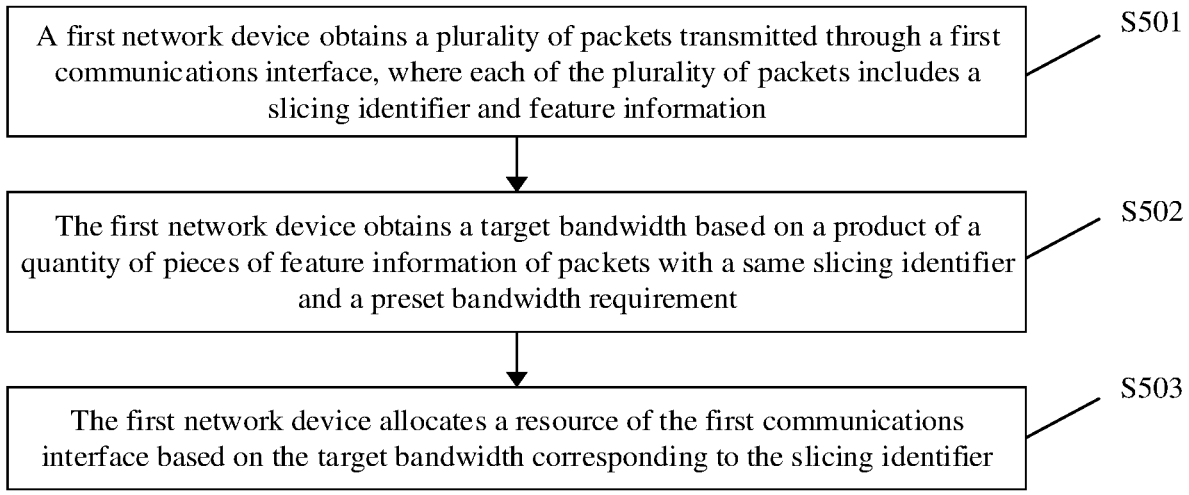
FIG. 5 is a flowchart of a third application scenario of a resource allocation method according to an embodiment.

FIG. 5 is a flowchart of a third application scenario of a resource allocation method according to an embodiment.

In FIG. 5, the resource allocation method provided in this embodiment includes the following steps.

S501: A first network device obtains a plurality of packets transmitted through a first communications interface, where each of the plurality of packets includes a slicing identifier and feature information.

In this embodiment, for the slicing identifier and the feature information, refer to the foregoing descriptions. Details are not described herein again.

S502: The first network device obtains a target bandwidth based on a product of a quantity of pieces of feature information of packets with a same slicing identifier and a preset bandwidth requirement.

In this embodiment, the packets with the same slicing identifier may include one or more pieces of feature information. For example, packets whose slicing identifiers are a slicing ID 1 include three flow identifiers in total, and this means that the packets whose slicing identifiers are the slicing ID 1 belong to three different flows. For another example, packets whose slicing identifiers are a slicing ID 2 include five user identifiers in total, and this means that the packets whose slicing identifiers are the slicing ID 2 correspond to five different users.

In this embodiment, the target bandwidth is obtained based on the product of the quantity of pieces of feature information of the packets with the same slicing identifier and the preset bandwidth requirement. The preset bandwidth requirement may be considered as a possible implementation of the foregoing preset resource requirement. The target bandwidth may be considered as a possible implementation of the foregoing target resource reservation information.

Table 6 is an example of a correspondence between a slicing identifier and a flow identifier.

TABLE 6

| Slicing identifier | Flow identifier |
|---|---|
| Slicing ID 1 | Flow ID 1 |
| | Flow ID 2 |
| Slicing ID 2 | Flow ID 3 |
| | Flow ID 4 |
| | Flow ID 5 |

As shown in Table 6, packets of a sliced network with the slicing ID 1 include two flow identifiers, and packets of a sliced network with the slicing ID 2 include three flow identifiers. It is assumed that a preset bandwidth requirement corresponding to each flow is 50M. In this case, a target bandwidth of the sliced network with the slicing ID 1 may be 100M, and a target bandwidth of the sliced network with the slicing ID 2 may be 150M.

Table 7 is an example of a correspondence between a slicing identifier and a user identifier.

TABLE 7

| Slicing identifier | User identifier |
|---|---|
| Slicing ID 1 | User ID 1 |
| | User ID 2 |
| | User ID 3 |
| Slicing ID 2 | User ID 1 |
| | User ID 4 |

As shown in Table 7, packets of a sliced network with the slicing ID 1 include three user identifiers, and packets of a sliced network with the slicing ID 2 include two user identifiers. It is assumed that a preset bandwidth requirement corresponding to each flow is 100M. In this case, a target bandwidth of the sliced network with the slicing ID 1 may be 300M, and a target bandwidth of the sliced network with the slicing ID 2 may be 200M.

S503: The first network device allocates a resource of the first communications interface based on the target bandwidth corresponding to the slicing identifier.

In this embodiment, for a related description of allocating the resource of the first communications interface, refer to the foregoing descriptions. Details are not described herein again.

In this embodiment, a target bandwidth is determined based on a product of a quantity of pieces of feature information corresponding to each sliced network and a preset bandwidth requirement. The target bandwidth reflects an actual bandwidth requirement of the corresponding sliced network to some extent. Therefore, in comparison with those in a conventional manner, packet transmission efficiency is improved, and a resource waste is avoided.

Figure 6:
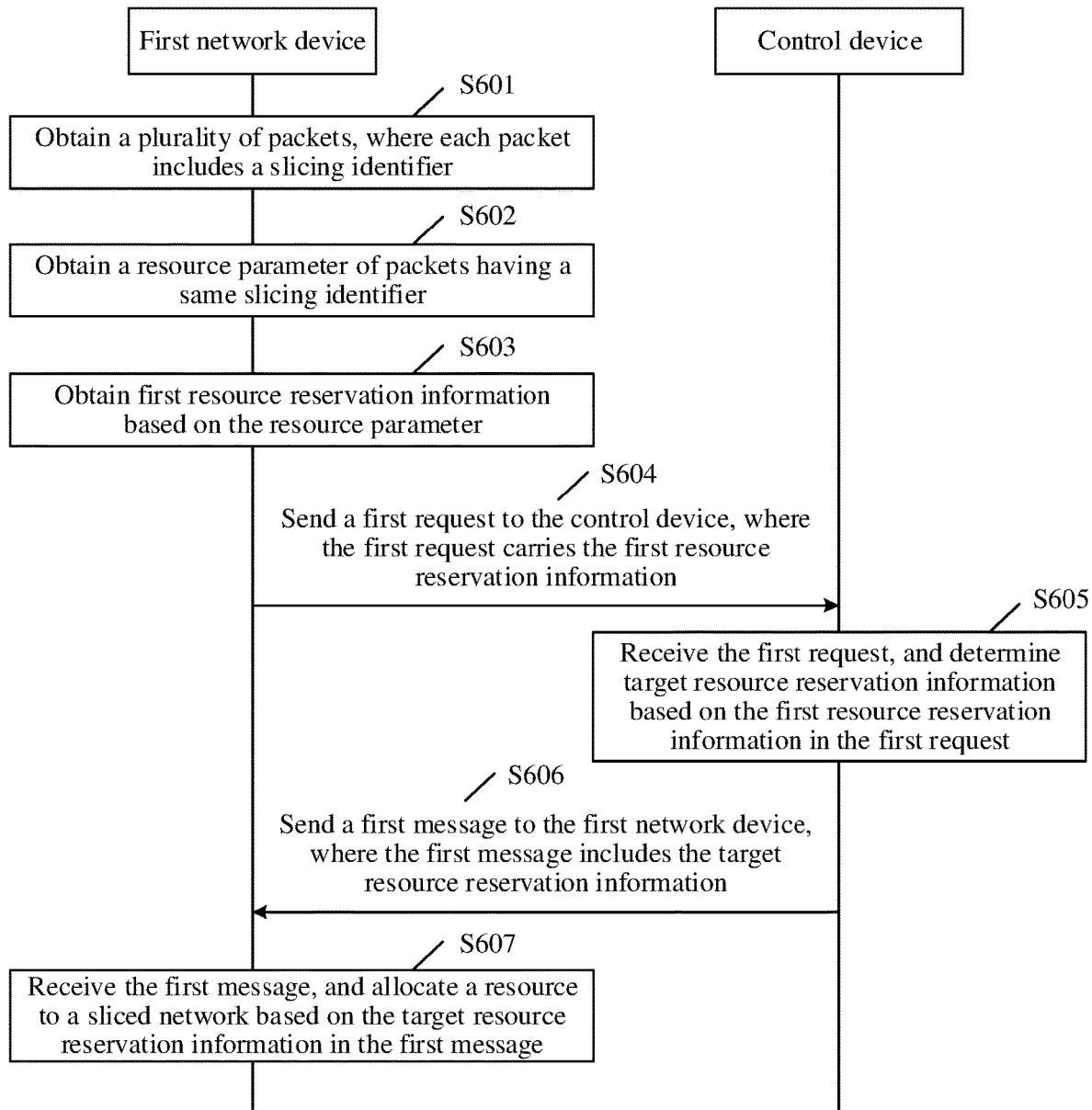
FIG. 6 is a flowchart of a fourth application scenario of a resource allocation method according to an embodiment.

FIG. 6 is a flowchart of a fourth application scenario of a resource allocation method according to an embodiment.

In FIG. 6, the resource allocation method provided in this embodiment includes the following steps.

S601: A first network device obtains a plurality of packets, where each of the plurality of packets includes a slicing identifier.

In this embodiment, the first network device may be a head node, for example, the network device 201 in FIG. 1B. Certainly, the first network device may alternatively be a node other than the head node and a tail node, for example, the network device 202 in FIG. 1B.

S602: The first network device obtains a resource parameter of packets with a same slicing identifier.

In this embodiment, the resource parameter may be the traffic peak, the traffic average, the resource requirement corresponding to the feature information, and the like that are mentioned above. Details are not described herein again.

Optionally, the first network device may obtain an identifier of a destination node of each of the plurality of packets, and obtain a resource parameter of packets that have a same slicing identifier and that correspond to a same destination node identifier.

In this embodiment, the first network device and the destination node may belong to a same domain, or may belong to different domains. A same destination node identifier indicates a same destination node.

The first network device may obtain the identifier of the destination node of each packet based on the plurality of packets in a plurality of implementations. This is not specifically limited in this disclosure. For example, the first network device may obtain, based on a destination address of a packet, an identifier of a destination node corresponding to the packet. The identifier of the destination node is an identifier that is of a BGP next-hop network device and that is obtained by the first network device based on the destination address, and the next-hop network device and the first network device are located in a same autonomous system (AS). In a segment routing (SR) network scenario, the first network device may also obtain the identifier of the destination node based on other information, for example, may obtain the identifier of the destination node based on a label or an SID of a next-hop device.

S603: The first network device obtains first resource reservation information based on the resource parameter.

In this embodiment, the first network device may obtain the first resource reservation information in the foregoing provided manner of obtaining the target resource reservation information. Details are not described herein.

S604: The first network device sends a first request to a control device, where the first request carries the first resource reservation information.

In this embodiment, the first request is used to indicate the control device to determine target resource reservation information based on the first resource reservation information.

As described above, the control device may determine the target resource reservation information based on the first resource reservation information in a plurality of implementations. Details are not described herein again.

Optionally, the first request may further include one or more of the identifier of the destination node and the slicing identifier. When the plurality of packets correspond to a same slicing identifier, the first request may carry no slicing identifier. When the control device does not need to perform path computation based on the identifier of the destination node, the first request may not include the identifier of the destination node.

If the first request includes the identifier of the destination node, the first request may include an SLA of a sliced network, so that the control device can compute a forwarding path that meets the SLA.

S605: The control device receives the first request, and determines the target resource reservation information based on the first resource reservation information in the first request.

In this embodiment, when the first request further includes the identifier of the destination node, the control device may further perform path computation based on the identifier of the destination node, that is, generate a forwarding path from the first network device to the destination node.

As described above, theoretically, the forwarding path needs to meet a reservation requirement corresponding to the first resource reservation information. However, if no forwarding path meets the reservation requirement corresponding to the first resource reservation information regardless of a computation manner in an actual case, the control device may determine the target resource reservation information based on the first resource reservation information, and compute the forwarding path based on the target resource reservation information. Although the target resource reservation information is less than the first resource reservation information, the target resource reservation information needs to be as close as possible to the first resource reservation information, so that the computed forwarding path can reduce packet transmission efficiency as much as possible.

In another possible case, in actual application, in addition to the first network device, the control device may further receive a first request sent by another network device on the forwarding path. If first resource reservation information sent by the another network device on the forwarding path is different from the first resource reservation information sent by the first network device, the control device may determine the target resource reservation information based on first resource reservation information sent by each network device on the forwarding path, and the forwarding path meets a reservation requirement corresponding to the target resource reservation information. For example, first resource reservation information that is sent by the network device 201 to the control device 301 and that corresponds to a slicing identifier slicing ID 1 is 100M, but first resource reservation information that is sent by the network device 202 to the control device 301 and that corresponds to the slicing identifier slicing ID 1 is 95M. In this case, when the forwarding path (namely, the network device 201→the network device 202→the network device 203) can meet the reservation requirement, the target resource reservation information may be determined as 100M.

S606: The control device sends a first message to the first network device, where the first message includes the target resource reservation information.

Optionally, the first message may further include one or more of the slicing identifier and forwarding path information of the forwarding path. The forwarding path information is information for identifying the forwarding path, for example, a SID list, a label of a next-hop device, and an outbound interface.

For example, the control device 301 sends the first message to the network device 201, and the first message includes the slicing identifier, the target resource reservation information, and the SID list. A forwarding path identified by the SID list is: the network device 201→the network device 202→the network device 203.

For another example, the control device 301 sends the first message to the network device 202, and the first message includes the slicing identifier, the target resource reservation information, and an identifier of an outbound interface of the network device 202. The outbound interface of the network device 202 is a physical interface connected to the network device 203. In this way, the network device 202 may send a second packet including the slicing identifier to the network device 203 through the outbound interface of the network device 202.

S607: The first network device receives the first message, and allocates a resource to the sliced network based on the target resource reservation information in the first message.

When the first message includes the slicing identifier, the first network device may allocate, based on the target resource reservation information in the first message, the resource to the sliced network corresponding to the slicing identifier.

For example, the network device 201 receives the first message sent by the control device 301, and the target resource reservation information in the first message is 50M. In this case, the network device 201 may generate a logical sub-interface D1 of 50M for the sliced network corresponding to the slicing identifier in the first message, and the logical sub-interface D1 of 50M is a logical sub-interface corresponding to a physical interface that is of the network device 201 and that is connected to the network device 202. The network device 202 receives the first message sent by the control device 301. In this case, the network device 202 may generate a logical sub-interface D2 of 50M for the sliced network corresponding to the slicing identifier in the first message, and the logical sub-interface D2 of 50M is a logical sub-interface corresponding to a physical interface that is of the network device 202 and that is connected to the network device 203.

In addition, when the first message further includes the forwarding path information, the first network device may further generate a forwarding table based on the forwarding path information. The forwarding table is used to forward the second packet including the slicing identifier to a next-hop network device on the forwarding path. In addition, a resource corresponding to the slicing identifier in the second packet is used for forwarding.

In this embodiment, the control device delivers the target resource reservation information, but the target resource reservation information is obtained based on the first resource reservation information that reflects an actual requirement of the sliced network. Therefore, in comparison with those in a conventional manner, in this embodiment, packet transmission efficiency is improved, and a resource waste is avoided.

Figure 7:
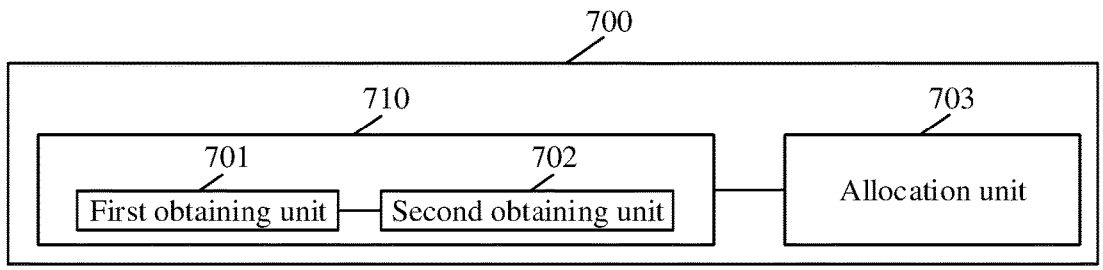
FIG. 7 is a schematic structural diagram of a resource allocation apparatus 700 according to an embodiment.

Correspondingly, referring to FIG. 7, an embodiment further provides a resource allocation apparatus 700. The apparatus 700 is applied to a first network device, and the first network device may perform a function of the first network device in the embodiments shown in FIG. 2 to FIG. 6. The apparatus 700 includes an obtaining unit 710 and an allocation unit 703. The obtaining unit 710 includes a first obtaining unit 701 and a second obtaining unit 702. The obtaining unit 710 is configured to obtain target resource reservation information based on a plurality of first packets transmitted by the first network device. The obtaining unit 710 may be configured to perform S202' in the embodiment shown in FIG. 2B. The first obtaining unit 701 may be configured to perform S206 in the embodiment shown in FIG. 2A, S301 and S302 in the embodiment shown in FIG. 3, S401 in the embodiment shown in FIG. 4, S501 in the embodiment shown in FIG. 5, and S601 and S602 in the embodiment shown in FIG. 6. The second obtaining unit 702 is configured to perform S207 in the embodiment shown in FIG. 2A, S303 in the embodiment shown in FIG. 3, S402 in the embodiment shown in FIG. 4, S502 in the embodiment shown in FIG. 5, and S603 and S604 in the embodiment shown in FIG. 6. The allocation unit 703 is configured to perform S208 in the embodiment shown in FIG. 2A, S203' in the embodiment shown in FIG. 2B, S304 in the embodiment shown in FIG. 3, S403 in the embodiment shown in FIG. 4, S503 in the embodiment shown in FIG. 5, and S607 in the embodiment shown in FIG. 6.

For example, the first obtaining unit 701 is configured to: obtain a resource parameter based on the plurality of transmitted first packets. All of the plurality of first packets carry a same virtual network identifier, and the virtual network identifier is used to indicate that all the first packets are transmitted through a same virtual network. The second obtaining unit 702 is configured to obtain the target resource reservation information based on the resource parameter. The allocation unit 703 is configured to allocate a resource to the virtual network based on the target resource reservation information.

For other content of the resource allocation apparatus 700, refer to the foregoing descriptions. Details are not described herein again.

Figure 8:
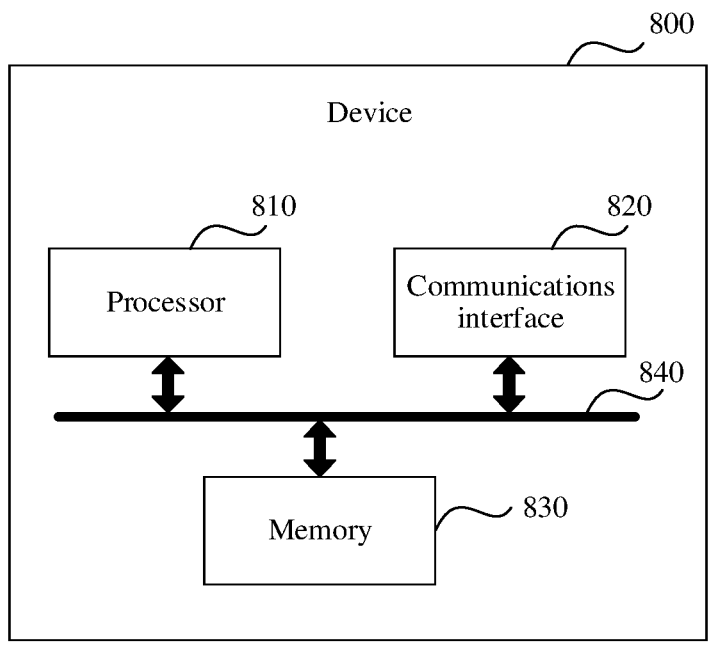
FIG. 8 is a schematic structural diagram of a network device 800 according to an embodiment.

Referring to FIG. 8, an embodiment further provides a network device 800. The network device 800 includes at least one processor 802 and at least one communications interface 803. Further, the network device 800 may include at least one memory 830, and the memory 830 is configured to store a computer program or an instruction. The memory 830 may be a memory inside the processor, or may be a memory outside the processor. When the embodiment shown in FIG. 7 is implemented, and the units described in the embodiment in FIG. 7 are implemented by using software, software or program code required for performing functions of the first obtaining unit 701, the second obtaining unit 702, and the allocation unit 703 in FIG. 7 is stored in the memory 830. The processor 810 is configured to execute the instruction in the memory 810, so that the network device 800 performs the resource allocation method applied to the first network device in the embodiments shown in FIG. 2 to FIG. 6. The communications interface 820 is configured to communicate with another network device.

The memory 830, the processor 810, and the communications interface 820 are mutually connected through a bus 840. The bus 840 may be a Peripheral Component Interconnect (PCI) bus, an Extended Industry Standard Architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

In a specific embodiment, the processor 810 is configured to: obtain target resource reservation information based on a plurality of transmitted first packets, where all of the plurality of first packets carry a same virtual network identifier, and the virtual network identifier is used to indicate that all the first packets are transmitted through a same virtual network; and allocate a resource to the virtual network based on the target resource reservation information. For a detailed processing process of the processor 810, refer to detailed descriptions of the embodiments shown in FIG. 2 to FIG. 6. Details are not described herein again.

The communications interface 820 is configured to interact with a control device or a second network device. For a detailed process, refer to detailed descriptions of the embodiments shown in FIG. 2 to FIG. 6. Details are not described herein again.

The memory 830 may be a random-access memory (RAM), a flash memory, a read-only memory (ROM), an erasable programmable ROM (EPROM), an electrically erasable programmable ROM (EEPROM), a register, a hard disk, a removable hard disk, a CD-ROM, or any other form of storage medium known to a person skilled in the art.

The processor 810 may be, for example, a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this disclosure. Alternatively, the processor may be a combination of processors implementing a computing function, for example, a combination of one or more microprocessors, or a combination of a DSP and a microprocessor.

The communications interface 803 may be, for example, an interface card, or may be an Ethernet interface or an asynchronous transfer mode (ATM) interface.

Figure 9:
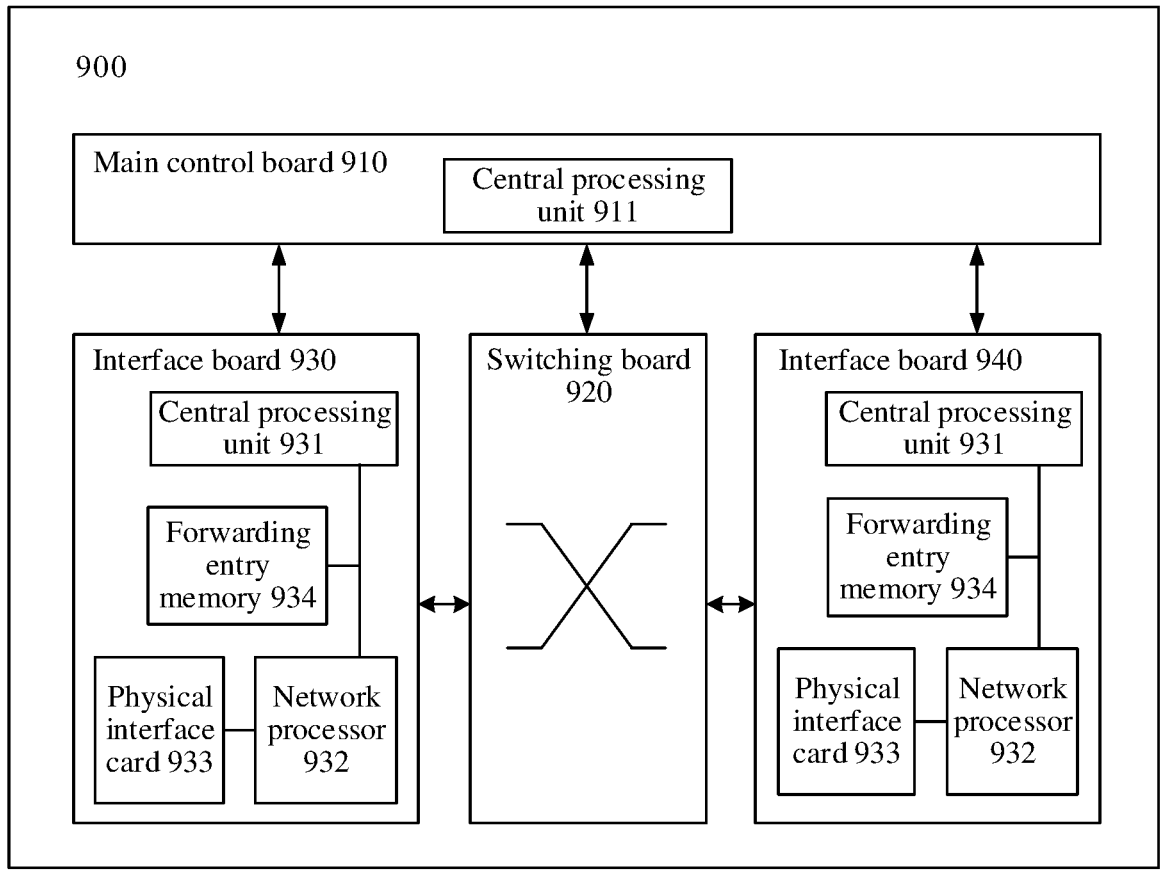
FIG. 9 is a schematic structural diagram of a network device 900 according to an embodiment.

FIG. 9 is a schematic structural diagram of a first network device 900 according to an embodiment. The first network device shown in the embodiments in FIG. 2A to FIG. 6 may be implemented by using the device shown in FIG. 9. Referring to the schematic structural diagram of the device in FIG. 9, the device 900 includes a main control board and one or more interface boards, and the main control board and the interface board are communicatively connected. The main control board is also referred to as a main processing unit (MPU) or a route processor card. The main control board is responsible for controlling and managing each component in the device 900, including route computation, device management, and maintenance functions. The interface board is also referred to as a line processing unit (LPU) or a line card, and is configured to forward data. In some embodiments, the device 900 may also include a switching board, the switching board is communicatively connected to the main control board and the interface board, the switching board is configured to forward data between the interface boards, and the switching board may also be referred to as a switch fabric unit (SFU). The interface board includes a central processing unit, a memory, a forwarding chip, and a physical interface card (PIC). The central processing unit is communicatively connected to the memory, a network processor, and the physical interface card. The memory is configured to store a forwarding table. The forwarding chip is configured to forward a received data packet based on the forwarding table stored in the memory. If a destination address of the data packet is an address of the device 900, the data packet is sent to the CPU such as a central processing unit 931 for processing. If a destination address of the data packet is not an address of the device 900, a next hop and an outbound interface corresponding to the destination address are found from the forwarding table based on the destination address, and the data packet is forwarded to the outbound interface corresponding to the destination address. The forwarding chip may be a network processor (NP). The PIC, also referred to as a subcard, can be installed on the interface board, and is responsible for converting a photoelectric signal into a data packet, checking validity of the data packet, and forwarding the data packet to the forwarding chip for processing. In some embodiments, the central processing unit may also perform a function of the forwarding chip. For example, software forwarding is implemented based on a general-purpose CPU. In this case, the forwarding chip is not required on the interface board. A communication connection among the main control board, the interface board, and the switching board can be implemented through a bus. In some embodiments, the forwarding chip may be implemented by using an ASIC or an FPGA.

Logically, the device 900 includes a control plane and a forwarding plane. The control plane includes a main control board and a central processing unit, and the forwarding plane includes components for performing forwarding, such as the memory, the PIC, and the NP. The control plane performs functions such as a function of a router, generating a forwarding table, processing signaling and protocol packets, and configuring and maintaining a status of a device. The control plane delivers the generated forwarding table to the forwarding plane. On the forwarding plane, the NP searches the forwarding table delivered by the control plane to forward a packet received by the PIC of the device 900. The forwarding table delivered by the control plane may be stored in the memory. In some embodiments, the control plane and the forwarding plane may be completely separated, and are not on a same device. The following briefly describes the foregoing process with reference to the embodiment in FIG. 2A.

As shown in the method described in FIG. 2A, the first network device may transmit a plurality of first packets through a physical interface card 933, and send the plurality of first packets to the CPU 931 for processing. The CPU 931 may obtain target resource reservation information based on the plurality of transmitted first packets, where all of the plurality of first packets carry a same virtual network identifier, and the virtual network identifier is used to indicate that all the first packets are transmitted through a same virtual network; and allocate a resource to the virtual network based on the target resource reservation information.

The first network device provided in this embodiment may correspond to the first network device in the method embodiments in FIG. 2A to FIG. 6, and may implement functions of the first network device and/or various steps and methods implemented by the first network device in the foregoing method embodiments. The foregoing is merely a brief example description. For brevity, details are not described herein again.

It should be noted that there may be one or more main control boards, and when there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there are a plurality of switching boards, load sharing and redundancy backup may be implemented together. In a centralized forwarding architecture, the network device may not require the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may have only one card. To be specific, there is no switching board, and functions of the interface board and the main control board are integrated on the card. In this case, a central processing unit on the interface board and a central processing unit on the main control board may be combined into one central processing unit on the card, to perform functions obtained after the two central processing units are combined. A device in this form (for example, a network device such as a low-end switch or router) has a relatively low data exchange and processing capability. A specifically used architecture depends on a specific networking deployment scenario, and this is not limited herein.

Figure 10:
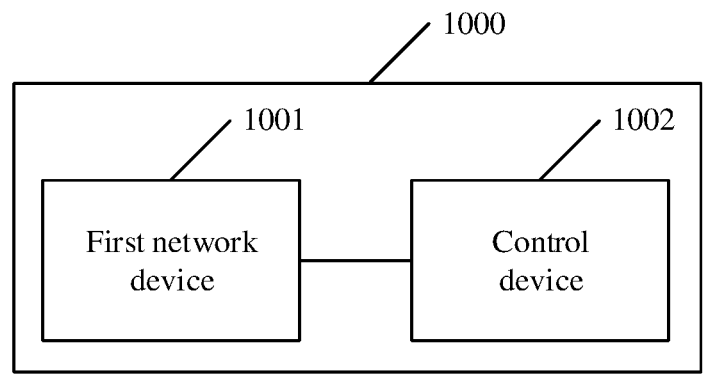
FIG. 10 is a schematic structural diagram of a resource allocation system 1000 according to an embodiment.

Referring to FIG. 10, an embodiment further provides a resource allocation system 1000. The system includes a first network device 1001 and a control device 1002.

The first network device 1001 is configured to obtain first resource reservation information based on a plurality of transmitted first packets. All of the plurality of first packets carry a same virtual network identifier, and the virtual network identifier is used to indicate that all the first packets are transmitted through a same virtual network.

The first network device 1001 is further configured to send a first request to the control device. The first request includes the first resource reservation information.

The control device 1002 is configured to: receive the first request, determine a target resource reservation information based on the first resource reservation information in the first request, and send a first message to the first network device, where the first message includes the target resource reservation information.

The first network device 1001 is further configured to: receive the first message sent by the control device, and allocate a resource to the virtual network based on the target resource reservation information.

For details of the foregoing steps performed by the first network device 1001 and the control device 1002, refer to the descriptions in the foregoing method embodiments. Details are not described herein again.

Figure 11:
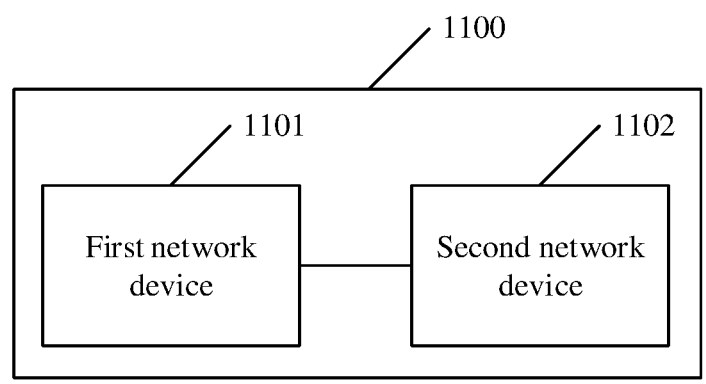
FIG. 11 is a schematic structural diagram of a resource allocation system 1100 according to an embodiment.

Referring to FIG. 11, an embodiment further provides a resource allocation system 1100. The system 1100 includes a first network device 1101 and a second network device 1102.

The first network device 1101 is configured to obtain first resource reservation information based on a plurality of transmitted first packets. All of the plurality of first packets carry a same virtual network identifier, and the virtual network identifier is used to indicate that all the first packets are transmitted through a same virtual network. The second network device 1102 is configured to send a second message to the first network device. The second message includes second resource reservation information that is determined by the second network device and that corresponds to the virtual network. The first network device 1101 is further configured to: receive the second message, determine target resource reservation information based on the first resource reservation information and the second resource reservation information, and allocate a resource to the virtual network based on the target resource reservation information.

Optionally, the first network device 1101 is further configured to send a third message to the second network device 1102. The third message includes the first resource reservation information. The second network device is further configured to: receive the third message, and determine, based on the first resource reservation information and the second resource reservation information, a resource that needs to be allocated to the virtual network.

For details of the foregoing steps performed by the first network device 1101 and the second network device 1102, refer to the descriptions in the foregoing method embodiments. Details are not described herein again.

Figure 12:
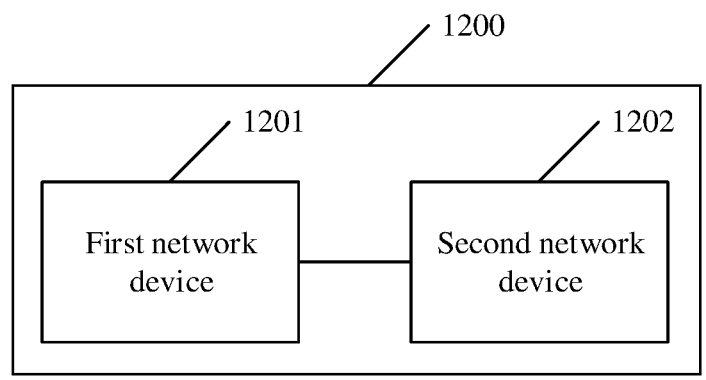
FIG. 12 is a schematic structural diagram of a resource allocation system 1200 according to an embodiment.

Referring to FIG. 12, an embodiment further provides a resource allocation system 1200. The system 1200 includes a first network device 1201 and a second network device 1202. The first network device 1201 is configured to: obtain target resource reservation information based on a plurality of transmitted first packets, where all of the plurality of first packets carry a same virtual network identifier, and the virtual network identifier is used to indicate that all the first packets are transmitted through a same virtual network; and allocate a resource to the virtual network based on the target resource reservation information. The first network device 1201 is further configured to send a fourth message to the second network device 1202. The fourth message includes the target resource reservation information. The second network device 1202 is configured to: receive the fourth message, and allocate a resource to the virtual network based on the target resource reservation information in the fourth message.

For details of the foregoing steps performed by the first network device 1201 and the second network device 1202, refer to the descriptions in the foregoing method embodiments. Details are not described herein again.

In addition, an embodiment further provides a computer readable storage medium, including a computer program. When the computer program is run on a computer, the computer is enabled to perform the resource allocation method applied to the first network device 1001, the first network device 1101, or the first network device 1201.

An embodiment further provides a chip system, including a processor. The processor is coupled to a memory, the memory is configured to store a program or an instruction, and when the program or the instruction is executed by the processor, the chip system is enabled to implement the method in any one of the foregoing method embodiments.

Optionally, there may be one or more processors in the chip system. The processor may be implemented by using hardware, or may be implemented by using hardware. When the processor is implemented by using hardware, the processor may be a logic circuit, an integrated circuit, or the like. When the processor is implemented by using software, the processor may be a general-purpose processor, and is implemented by reading software code stored in the memory.

Optionally, there may be one or more memories in the chip system. The memory may be integrated with the processor, or may be disposed separately from the processor. This is not limited in this disclosure. For example, the memory may be a non-transitory processor, for example, a read-only memory ROM. The memory and the processor may be integrated onto a same chip, or may be separately disposed on different chips. A type of the memory and a manner of disposing the memory and the processor are not specifically limited in this disclosure.

For example, the chip system may be an FPGA, an ASIC, a system on chip (SoC), a CPU, an NP, a DSP, a micro controller unit (MCU), a programmable logic device (PLD), or another integrated chip.

It should be understood that steps in the foregoing method embodiments may be implemented by using a hardware integrated logical circuit in the processor or an instruction in a form of software. The method steps disclosed with reference to the embodiments may be directly performed by a hardware processor, or may be performed by using a combination of hardware in the processor and a software module.

In the specification, claims, and accompanying drawings, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

"At least one (piece)" means one or more, and "a plurality of" means two or more. "At least one (piece) of the following" or a similar expression thereof means any combination of these items, including a single item (piece) or any combination of a plurality of items (pieces). For example, at least one (piece) of a, b, or c may indicate: a, b, c, a and b, a and c, b and c, or a, b, and c, where a, b, and c may be singular or plural. "A and/or B" includes only A, only B, and A and B.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, division into units is merely logical module division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, modules or units in the embodiments may be integrated into one processing unit, or each of the units may exist alone physically, or two or more units may be integrated into one unit. The integrated unit may be implemented in a form of hardware, or may be implemented in a form of a software module or unit.

When the integrated unit is implemented in the form of a software module or unit and sold or used as an independent product, the integrated unit may be stored in a computer readable storage medium. Based on such an understanding, the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a ROM, a RAM, a magnetic disk, or an optical disc.

Functions described in the disclosure may be implemented by hardware, software, firmware, or any combination thereof. When the functions are implemented by software, the functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general-purpose computer or a dedicated computer.

In the foregoing specific implementations, the objectives, technical solutions, and beneficial effects of are further described in detail. It should be understood that the foregoing descriptions are merely specific implementations of the disclosure.

In conclusion, the foregoing embodiments are merely intended for describing the technical solutions, but not for limiting this disclosure. Persons of ordinary skill in the art should understand that they may still make modifications to the technical solutions described in the foregoing embodiments or make equivalent replacements to some technical features thereof, without departing from the scope of the technical solutions of the embodiments.

What is claimed is:

1. A method implemented by a first network device and comprising:
    obtaining target resource reservation information based on a plurality of first packets, wherein all of the first packets carry a same virtual network identifier (ID) indicating that all of the first packets are transmitted through a same virtual network;
    allocating a resource to the virtual network based on the target resource reservation information; and
    releasing the resource after allocating the resource and when obtaining, in a preset time period, no second packet comprising the virtual network identifier.

2. The method of claim 1, further comprising:
    obtaining a resource parameter based on the first packets; and
    further obtaining the target resource reservation information based on the resource parameter.

3. The method of claim 2, wherein the resource parameter comprises at least one of a traffic peak or a traffic average, and wherein the method further comprises:
    obtaining the traffic peak or the traffic average by performing statistics collection based on the first packets; and
    further obtaining the target resource reservation information based on the traffic peak or the traffic average.

4. The method of claim 2, wherein the resource parameter comprises a feature information set, and wherein the feature information set comprises one or more pieces of feature information.

5. The method of claim 4, further comprising further obtaining the target resource reservation information based on a sum of resource requirements corresponding to all pieces of feature information in the feature information set.

6. The method of claim 5, wherein a resource requirement corresponding to each of the pieces of feature information is carried in one or more of the first packets that correspond to the feature information, or wherein a resource requirement corresponding to each of the pieces of feature information is a preset resource requirement.

7. The method of claim 4, further comprising further obtaining the target resource reservation information based on a product of a quantity of pieces of feature information in the feature information set and a resource requirement.

8. The method of claim 4, wherein the feature information comprises a flow ID, a user ID, a 5-tuple, or a 7-tuple.

9. The method of claim 2, further comprising:
    obtaining first resource reservation information based on the resource parameter;
    sending, to a control device, a first request comprising the first resource reservation information and instructing the control device to determine the target resource reservation information based on the first resource reservation information; and
    receiving, from the control device, a first message comprising the target resource reservation information and responding to the first request.

10. The method of claim 2, further comprising:
    obtaining first resource reservation information based on the resource parameter;
    receiving, from a second network device, a second message comprising second resource reservation information that corresponds to the virtual network; and
    determining the target resource reservation information based on the first resource reservation information and the second resource reservation information.

11. The method of claim 10, further comprising sending, to the second network device, a third message comprising the first resource reservation information and instructing the second network device to determine, based on the first resource reservation information, a resource that needs to be allocated to the virtual network.

12. The method of claim 1, further comprising sending, to a third network device, a fourth message comprising the target resource reservation information and instructing the third network device to determine, based on the target resource reservation information, a resource that needs to be allocated to the virtual network.

13. The method of claim 1, further comprising transmitting the first packets through a communications interface, and wherein the resource is of the communications interface.

14. The method of claim 1, wherein the virtual network comprises a sliced network.

15. The method of claim 1, wherein the target resource reservation information comprises at least one of bandwidth information or use duration information.

16. The method of claim 15, wherein the target resource reservation information further comprises at least one of physical interface information, logical interface information, or queue information.

17. The method of claim 1, further comprising transmitting a second packet through the resource, wherein the second packet carries the virtual network identifier.

18. A network device comprising:
a memory configured to store instructions; and
a processor coupled to the memory and configured to execute the instructions to cause the network device to:
obtain target resource reservation information based on a plurality of first packets, wherein the target resource reservation information comprises at least one of bandwidth information or use duration information and comprises at least one of physical interface information, logical interface information, or queue information, and wherein all of the first packets carry a same virtual network identifier (ID) indicating that all of the first packets are transmitted through a same virtual network; and
allocate a resource to the virtual network based on the target resource reservation information.

19. The network device of claim 18, wherein the processor is further configured to execute the instructions to cause the network device to release the resource after allocating the resource and when obtaining, in a preset time period, no second packet comprising the virtual network identifier.

20. A resource allocation system comprising:
a network device configured to:
obtain first resource reservation information based on a plurality of first packets, wherein all of the first packets carry a same virtual network identifier (ID) indicating that all of the first packets are transmitted through a same virtual network, and
send a first request comprising the first resource reservation information; and
a control device configured to:
receive the first request,
determine target resource reservation information based on the first resource reservation information, and
send, to the network device, a first message comprising the target resource reservation information,
wherein the network device is further configured to:
receive the first message from the control device, and
allocate a resource to the virtual network based on the target resource reservation information.

* * * * *